United States Patent
Aigerman et al.

(10) Patent No.: US 12,347,034 B2
(45) Date of Patent: Jul. 1, 2025

(54) GENERATING MAPPINGS OF THREE-DIMENSIONAL MESHES UTILIZING NEURAL NETWORK GRADIENT FIELDS

(71) Applicant: Adobe Inc., San Jose, CA (US)

(72) Inventors: Noam Aigerman, San Francisco, CA (US); Kunal Gupta, San Diego, CA (US); Jun Saito, Seattle, WA (US); Thibault Groueix, Grenoble (FR); Vladimir Kim, Seattle, WA (US); Siddhartha Chaudhuri, Bangalore (IN)

(73) Assignee: Adobe Inc., San Jose, CA (US)

( * ) Notice: Subject to any disclaimer, the term of this patent is extended or adjusted under 35 U.S.C. 154(b) by 264 days.

(21) Appl. No.: 17/808,808

(22) Filed: Jun. 24, 2022

(65) Prior Publication Data

US 2023/0281925 A1    Sep. 7, 2023

Related U.S. Application Data

(60) Provisional application No. 63/268,899, filed on Mar. 4, 2022.

(51) Int. Cl.
*G06T 17/20*    (2006.01)
*G06T 7/73*    (2017.01)

(52) U.S. Cl.
CPC ............ *G06T 17/20* (2013.01); *G06T 7/75* (2017.01); *G06T 2207/20081* (2013.01); *G06T 2207/20084* (2013.01)

(58) Field of Classification Search
CPC ........... G06T 17/20; G06T 7/75; G06T 7/205; G06T 2207/20081; G06T 2207/20084
See application file for complete search history.

(56) References Cited

U.S. PATENT DOCUMENTS

2024/0331247 A1 * 10/2024 Smith ................. G06V 40/176

FOREIGN PATENT DOCUMENTS

| AU | 2024200377 A1 * | 10/2024 | ......... G06F 3/04842 |
| WO | WO-2018067978 A1 * | 4/2018 | ......... G06K 9/00201 |

OTHER PUBLICATIONS

Noam Aigerman and Yaron Lipman. 2013. Injective and bounded distortion mappings in 3D. ACM Transactions on Graphics (TOG) 32, 4 (2013), 1-14.

(Continued)

*Primary Examiner* — Chante E Harrison
(74) *Attorney, Agent, or Firm* — Keller Preece PLLC

(57) ABSTRACT

Methods, systems, and non-transitory computer readable storage media are disclosed for generating digital chain pull paintings in digital images. The disclosed system generate, utilizing a neural network, a plurality of matrices over an ambient space for a plurality of polygons of a three-dimensional mesh based on a plurality of features of the plurality of polygons associated with the three-dimensional mesh. The disclosed system determines a gradient field based on the plurality of matrices of the plurality of polygons. The disclosed system generates a mapping for the three-dimensional mesh based on the gradient field and a differential operator corresponding to the three-dimensional mesh.

20 Claims, 13 Drawing Sheets

(56) References Cited

OTHER PUBLICATIONS

Dragomir Anguelov, Praveen Srinivasan, Daphne Koller, Sebastian Thrun, Jim Rodgers, and James Davis. 2005. SCAPE: Shape Completion and Animation of People. In Siggraph.
Mathieu Aubry, Ulrich Schlickewei, and Daniel Cremers. 2011. The wave kernel signature: A quantum mechanical approach to shape analysis. In 2011 IEEE international conference on computer vision workshops (ICCV workshops). IEEE, 1626-1633.
Stephen W Bailey, Dalton Omens, Paul Dilorenzo, and James F O'Brien. 2020. Fast and deep facial deformations. ACM Transactions on Graphics (TOG) 39, 4 (2020), 94-1.
Stephen W. Bailey, Dave Otte, Paul Dilorenzo, and James F. O'Brien. 2018. Fast and Deep Deformation Approximations. ACM Transactions on Graphics 37, 4 (Aug. 2018), 119:1-12. https://doi.org/10.1145/3197517.3201300 Presented at Siggraph 2018, Los Angeles.
Ilya Baran and Jovan Popović. 2007. Automatic Rigging and Animation of 3D Characters. ACM Trans. Graph. 26, 3 (Jul. 2007), 72-es. https://doi.org/10.1145/1276377.1276467.
Jan Bednarik, Shaifali Parashar, Erhan Gundogdu, Mathieu Salzmann, and Pascal Fua. 2020. Shape reconstruction by learning differentiable surface representations. In Proceedings of the IEEE/CVF Conference on Computer Vision and Pattern Recognition. 4716-4725.
Federica Bogo, Angjoo Kanazawa, Christoph Lassner, Peter Gehler, Javier Romero, and Michael J. Black. 2016. Keep it SMPL: Automatic Estimation of 3D Human Pose and Shape from a Single Image. In Computer Vision—ECCV 2016 (Lecture Notes in Computer Science). Springer International Publishing.
Federica Bogo, Javier Romero, Matthew Loper, and Michael J. Black. 2014. FAUST: Dataset and evaluation for 3D mesh registration. In CVPR.
Sofien Bouaziz, Andrea Tagliasacchi, Hao Li, and Mark Pauly. 2016. Modern Techniques and Applications for Real-Time Non-Rigid Registration. In SIGGRAPH Asia 2016 Courses (Macau) (SA '16). Association for Computing Machinery, New York, NY, USA, Article 11, 25 pages. https://doi.org/10.1145/2988458.2988490.
Xingyi Du, Noam Aigerman, Qingnan Zhou, Shahar Z Kovalsky, Yajie Yan, Danny M Kaufman, and Tao Ju. 2020. Lifting simplices to find injectivity. ACM Transactions on Graphics (TOG) 39, 4 (2020), 120-1.
Lawson Fulton, Vismay Modi, David Duvenaud, David I. W. Levin, and Alec Jacobson. 2019. Latent-space Dynamics for Reduced Deformable Simulation. Computer Graphics Forum (2019).
Lin Gao, Jie Yang, Yi-Ling Qiao, Yu-Kun Lai, Paul L Rosin, Weiwei Xu, and Shihong Xia. 2018. Automatic Unpaired Shape Deformation Transfer. ACM Transactions on Graphics (Proceedings of ACM SIGGRAPH Asia 2018) 37, 6 (2018), To appear.
Lin Gao, Jie Yang, Tong Wu, Yu-Jie Yuan, Hongbo Fu, Yu-Kun Lai, and Hao Zhang. 2019. SDM-NET: Deep generative network for structured deformable mesh. ACM Transactions on Graphics (TOG) 38, 6 (2019), 1-15.
Thibault Groueix, Matthew Fisher, Vladimir G. Kim, Bryan C. Russell, and Mathieu Aubry. 2018a. 3D-CODED: 3D Correspondences by Deep Deformation. ECCV (2018).
Thibault Groueix, Matthew Fisher, Vladimir G Kim, Bryan C Russell, and Mathieu Aubry. 2018b. AtlasNet: A Papier-Mache Approach to Learning 3D Surface Generation. arXiv preprint arXiv:1802.05384 (2018).
Thibault Groueix, Matthew Fisher, Vladimir G. Kim, Bryan C. Russell, and Mathieu Aubry. 2019. Deep Self-Supervised Cycle-Consistent Deformation for Few-Shot Shape Segmentation. SGP (2019).
Daniel Holden, Bang Chi Duong, Sayantan Datta, and Derek Nowrouzezahrai. 2019. Subspace neural physics: Fast data-driven interactive simulation. In Proceedings of the 18th annual ACM SIGGRAPH/Eurographics Symposium on Computer Animation. 1-12.

Daniel Holden, Jun Saito, and Taku Komura. 2015. Learning an Inverse Rig Mapping for Character Animation. In Proceedings of the 14th ACM Siggraph / Eurographics Symposium on Computer Animation (Los Angeles, California) (SCA '15). Association for Computing Machinery, New York, NY, USA, 165-173. https://doi.org/10.1145/2786784.2786788.
Jingwei Huang, Chiyu Max Jiang, Baiqiang Leng, BinWang, and Leonidas Guibas. 2020. Meshode: A robust and scalable framework for mesh deformation. arXiv preprint arXiv:2005.11617 (2020).
Alec Jacobson, Ilya Baran, Jovan Popovic, and Olga Sorkine. 2011. Bounded biharmonic weights for real-time deformation. ACM Trans. Graph. 30, 4 (2011), 78, Part 1.
Alec Jacobson, Ilya Baran, Jovan Popovic, and Olga Sorkine. 2011. Bounded biharmonic weights for real-time deformation. ACM Trans. Graph. 30, 4 (2011), 78, Part 2.
Chiyu Jiang, Jingwei Huang, Andrea Tagliasacchi, Leonidas Guibas, et al. 2020. Shapeflow: Learnable deformations among 3d shapes. arXiv preprint arXiv:2006.07982 (2020).
Tao Ju, Scott Schaefer, and Joe Warren. 2005. Mean value coordinates for closed triangular meshes. In ACM Siggraph 2005 Papers. 561-566.
Angjoo Kanazawa, Shubham Tulsiani, Alexei A. Efros, and Jitendra Malik. 2018. Learning Category-Specific Mesh Reconstruction from Image Collections. In ECCV.
Ladislav Kavan, Steven Collins, JiříŽára, and Carol O'Sullivan. 2008. Geometric skinning with approximate dual quaternion blending. ACM Transactions on Graphics (TOG) 27, 4 (2008), 1-23.
Theodore Kim and David Eberle. 2020. Dynamic Deformables: Implementation and Production Practicalities. In ACM Siggraph 2020 Courses (Virtual Event, USA) (Siggraph '20). Association for Computing Machinery, New York, NY, USA, Article 23, 182 pages. https://doi.org/10.1145/3388769.3407490.
Shahar Z Kovalsky, Noam Aigerman, Ronen Basri, and Yaron Lipman. 2014. Controlling singular values with semidefinite programming. ACM Trans. Graph. 33, 4 (2014), 68-1.
Bruno Lévy, Sylvain Petitjean, Nicolas Ray, and Jérôme Maillot. 2002. Least Squares Conformal Maps for Automatic Texture Atlas Generation. In Siggraph.
Peizhuo Li, Kfir Aberman, Rana Hanocka, Libin Liu, Olga Sorkine-Hornung, and Baoquan Chen. 2021. Learning Skeletal Articulations with Neural Blend Shapes. ACM Transactions on Graphics (TOG) 40, 4 (2021), 1.
Yaron Lipman. 2012. Bounded distortion mapping spaces for triangular meshes. ACM Transactions on Graphics (TOG) 31, 4 (2012), 1-13.
Yaron Lipman, David Levin, and Daniel Cohen-Or. 2008. Green coordinates. ACM Transactions on Graphics (TOG) 27, 3 (2008), 1-10.
Or Litany, Alex Bronstein, Michael Bronstein, and Ameesh Makadia. 2018. Deformable shape completion with graph convolutional autoencoders. In Proceedings of the IEEE conference on computer vision and pattern recognition. 1886-1895.
Ligang Liu, Lei Zhang, Yin Xu, Craig Gotsman, and Steven J. Gortler. 2008a. A Local/ Global Approach to Mesh Parameterization. In Proceedings of the Symposium on Geometry Processing (Copenhagen, Denmark) (SGP '08). Eurographics Association, Goslar, DEU, 1495-1504.
Minghua Liu, Minhyuk Sung, Radomir Mech, and Hao Su. 2021. DeepMetaHandles: Learning Deformation Meta-Handles of 3D Meshes with Biharmonic Coordinates. In Proceedings of the IEEE/CVF Conference on Computer Vision and Pattern Recognition. 12-21.
Luca Morreale, Noam Aigerman, Vladimir G Kim, and Niloy J. Mitra. 2021. Neural Surface Maps. In Proceedings of the IEEE/CVF Conference on Computer Vision and Pattern Recognition. 4639-4648.
Ashish Myles and Denis Zorin. 2013. Controlled-distortion constrained global parametrization. ACM Transactions on Graphics (TOG) 32, 4 (2013), 1-14.
Ryosuke Okuta, Yuya Unno, Daisuke Nishino, Shohei Hido, and Crissman Loomis. 2017. CuPy: A NumPy-Compatible Library for NVIDIA GPU Calculations. In Proceedings of Workshop on Machine Learning Systems (LearningSys) in the Thirty-first Annual Confer-

(56) References Cited

OTHER PUBLICATIONS ence on Neural Information Processing Systems (NIPS). http://learningsys.org/nips17/assets/papers/paper_16.pdf.

Ahmed A A Osman, Timo Bolkart, and Michael J. Black. 2020. STAR: A Sparse Trained Articulated Human Body Regressor. In European Conference on Computer Vision (ECCV). 598-613. https://star.is.tue.mpg.de.

Jeong Joon Park, Peter Florence, Julian Straub, Richard A. Newcombe, and Steven Lovegrove. 2019. DeepSDF: Learning Continuous Signed Distance Functions for Shape Representation. CVPR (2019).

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. 2019. PyTorch: An Imperative Style, High-Performance Deep Learning Library. In Advances in Neural Information Processing Systems 32, H. Wallach, H. Larochelle, A. Beygelzimer, F. d'Alché-Buc, E. Fox, and R. Garnett (Eds.). Curran Associates, Inc., 8024-8035. http://papers.neurips.cc/paper/9015-pytorch-an-imperative-stylehigh-performance-deep-learning-library.pdf.

Ulrich Pinkall and Konrad Polthier. 1993. Computing Discrete Minimal Surfaces and Their Conjugates. Experimental Mathematics 2 (1993), 15-36.

Charles R Qi, Hao Su, Kaichun Mo, and Leonidas J Guibas. 2017. Pointnet: Deep learning on point sets for 3d classification and segmentation. In Proceedings of the IEEE conference on computer vision and pattern recognition. 652-660.

Michael Rabinovich, Roi Poranne, Daniele Panozzo, and Olga Sorkine-Hornung. 2017. Scalable Locally Injective Mappings. ACM Transactions on Graphics 36, 2 (Apr. 2017), 16:1-16:16.

Cristian Romero, Dan Casas, Jesus Perez, and Miguel A. Otaduy. 2021. Learning Contact Corrections for Handle-Based Subspace Dynamics. ACM Trans. on Graphics (Proc. of ACM Siggraph) 40, 4 (2021). http://gmrv.es/Publications/2021/RCPO21.

Christian Schüller, Ladislav Kavan, Daniele Panozzo, and Olga Sorkine-Hornung. 2013. Locally injective mappings. In Computer Graphics Forum, vol. 32. Wiley Online Library, 125-135.

Nicholas Sharp and Keenan Crane. 2020. A Laplacian for Nonmanifold Triangle Meshes. Computer Graphics Forum (SGP) 39, 5 (2020).

Siyuan Shen, Yin Yang, Tianjia Shao, He Wang, Chenfanfu Jiang, Lei Lan, and Kun Zhou. 2021. High-order differentiable autoencoder for nonlinear model reduction. ACM Transactions on Graphics.

Jason Smith and Scott Schaefer. 2015. Bijective Parameterization with Free Boundaries. ACM Trans. Graph. 34, 4, Article 70 (Jul. 2015), 9 pages. https://doi.org/10.1145/2766947.

Olga Sorkine and Marc Alexa. 2007. As-Rigid-As-Possible Surface Modeling. In SGP.

Olga Sorkine and Mario Botsch. 2009. Interactive Shape Modeling and Deformation. In Eurographics Tutorials.

Robert W Sumner and Jovan Popović. 2004. Deformation transfer for triangle meshes. ACM Transactions on graphics (TOG) 23, 3 (2004), 399-405.

Qingyang Tan, Lin Gao, Yu-Kun Lai, and Shihong Xia. 2018. Variational Autoencoders for Deforming 3D Mesh Models. In CVPR.

Qingyang Tan, Zherong Pan, Lin Gao, and Dinesh Manocha. 2020. Realtime Simulation of Thin-Shell Deformable Materials Using CNN-Based Mesh Embedding. IEEE Robotics and Automation Letters 5, 2 (2020).

Marco Tarini, Kai Hormann, Paolo Cignoni, and Claudio Montani. 2004. PolyCube-Maps. In ACM Siggraph 2004 Papers (Los Angeles, California) (Siggraph '04). Association for Computing Machinery, New York, NY, USA, 853-860. https://doi.org/10.1145/1186562.1015810.

Mikaela Angelina Uy, Jingwei Huang, Minhyuk Sung, Tolga Birdal, and Leonidas Guibas. 2020. Deformation-aware 3d model embedding and retrieval. In European Conference on Computer Vision. Springer, 397-413.

Gül Varol, Javier Romero, Xavier Martin, Naureen Mahmood, Michael J. Black, Ivan Laptev, and Cordelia Schmid. 2017. Learning from Synthetic Humans. In CVPR.

Nanyang Wang, Yinda Zhang, Zhuwen Li, Yanwei Fu, Wei Liu, and Yu-Gang Jiang. 2018. Pixel2mesh: Generating 3d mesh models from single rgb images. In Proceedings of the European Conference on Computer Vision (ECCV). 52-67.

Yifan Wang, Noam Aigerman, Vladimir G. Kim, Siddhartha Chaudhuri, and Olga Sorkine-Hornung. 2020. Neural Cages for Detail-Preserving 3D Deformations. In CVPR.

Ofir Weber and Denis Zorin. 2014. Locally injective parametrization with arbitrary fixed boundaries. ACM Transactions on Graphics (TOG) 33, 4 (2014), 1-12.

Francis Williams, Teseo Schneider, Claudio Silva, Denis Zorin, Joan Bruna, and Daniele Panozzo. 2019. Deep geometric prior for surface reconstruction. In Proceedings of the IEEE/CVF Conference on Computer Vision and Pattern Recognition. 10130-10139.

Yuxin Wu and Kaiming He. 2018. Group normalization. In Proceedings of the European conference on computer vision (ECCV). 3-19.

Zhan Xu, Yang Zhou, Evangelos Kalogerakis, Chris Landreth, and Karan Singh. 2020. RigNet: Neural Rigging for Articulated Characters. ACM Trans. on Graphics 39 (2020).

Zhan Xu, Yang Zhou, Evangelos Kalogerakis, and Karan Singh. 2019. Predicting Animation Skeletons for 3D Articulated Models via Volumetric Nets. In 2019 International Conference on 3D Vision (3DV).

Guandao Yang, Serge Belongie, Bharath Hariharan, and Vladlen Koltun. 2021. Geometry Processing with Neural Fields. NeurIPS.

Kangxue Yin, Jun Gao, Maria Shugrina, Sameh Khamis, and Sanja Fidler. 2021. 3DStyleNet: Creating 3D Shapes with Geometric and Texture Style Variations. In Proceedings of International Conference on Computer Vision (ICCV).

Mianlun Zheng, Yi Zhou, Duygu Ceylan, and Jernej Barbic. 2021. A Deep Emulator for Secondary Motion of 3D Characters. In Proceedings of the IEEE/CVF Conference on Computer Vision and Pattern Recognition. 5932-5940.

Qingnan Zhou and Alec Jacobson. 2016. Thingi10k: A dataset of 10,000 3d-printing models. arXiv preprint arXiv:1605.04797 (2016).

Silvia Zuffi, Angjoo Kanazawa, David Jacobs, and Michael J. Black. 2017. 3D Menagerie: Modeling the 3D Shape and Pose of Animals. In IEEE Conf. on Computer Vision and Pattern Recognition (CVPR).

Alec Jacobson, Zhigang Deng, Ladislav Kavan, and JP Lewis. Skinning: Real-time Shape Deformation [Abstract]. In ACM Siggraph 2014 Courses. 2014.

Lijuan Liu, Youyi Zheng, Di Tang, Yi Yuan, Changjie Fan, and Kun Zhou. 2019. NeuroSkinning: Automatic skin binding for production characters with deep graph networks. ACM Transactions on Graphics (TOG), vol. 38, No. 4, pp. 1-12. Jul. 2019.

R. Luo et al., "NNWarp: Neural Network-Based Nonlinear Deformation", IEEE Transactions on Visualization and Computer Graphics, vol. 26, No. 4, pp. 1745-1759, doi: 10.1109/TVCG.2018.2881451, Apr. 1, 2020.

Qixing Huang, Xiangru Huang, Bo Sun, Zaiwei Zhang, Junfeng Jiang, and Chandrajit Bajaj. ARAPReg: An As-Rigid-As Possible Regularization Loss for Learning Deformable Shape Generators. rXiv preprint arXiv:2108.09432v2, Sep. 21, 2021.

* cited by examiner

GENERATING MAPPINGS OF THREE-DIMENSIONAL MESHES UTILIZING NEURAL NETWORK GRADIENT FIELDS

CROSS-REFERENCE TO RELATED APPLICATIONS

This application claims priority to U.S. Provisional Application No. 63/268,899, entitled "DEEP MAPPING OF MESHES FOR THREE-DIMENSIONAL MODELS," filed Mar. 4, 2022, the full disclosure of which is incorporated herein by reference.

BACKGROUND

Recent years have seen significant advancements in the field of three-dimensional modeling. For example, conventional systems have leveraged recent computing advancements to generate and render three-dimensional models in a variety of computing environments. Three-dimensional tasks (such as modeling, deforming, animating, UV texturing, registration, correspondences, simulation, and fabrication) often use mappings between three-dimensional domains, which can be a difficult and resource-expensive task. Specifically, predicting mappings can be difficult due to two main challenges: 1) three-dimensional surfaces have significant geometric and topological variation; and 2) mappings of three-dimensional surfaces should be detail preserving. Conventional modeling systems are limited in accuracy or applicability of operation by failing to account for differing triangulations of three-dimensional meshes and/or failing to preserve sufficient detail in three-dimensional meshes when generating mappings.

SUMMARY

This disclosure describes one or more embodiments of methods, non-transitory computer readable media, and systems that solve the foregoing problems (in addition to providing other benefits) by utilizing neural networks to generate mappings of three-dimensional meshes. The disclosed systems utilize a neural network to generate a set of matrices over an ambient space for polygons (e.g., triangles) in a three-dimensional mesh based on extracted features for the polygons. In some embodiments, the disclosed systems generate the matrices based on a combination of the extracted features and a global code of the three-dimensional mesh. Additionally, the disclosed systems determine a gradient field of intrinsic matrices based on the matrices by restricting the matrices to tangent spaces corresponding to the polygons. The disclosed systems generate a mapping for the three-dimensional mesh based on the gradient field and a differential operator (e.g., a Laplacian) determined based on the three-dimensional mesh. The disclosed systems thus provide flexible and accurate mappings of three-dimensional meshes that are agnostic to triangulation of the meshes.

BRIEF DESCRIPTION OF THE DRAWINGS

Various embodiments will be described and explained with additional specificity and detail through the use of the accompanying drawings in which.

DETAILED DESCRIPTION

Figure 1:
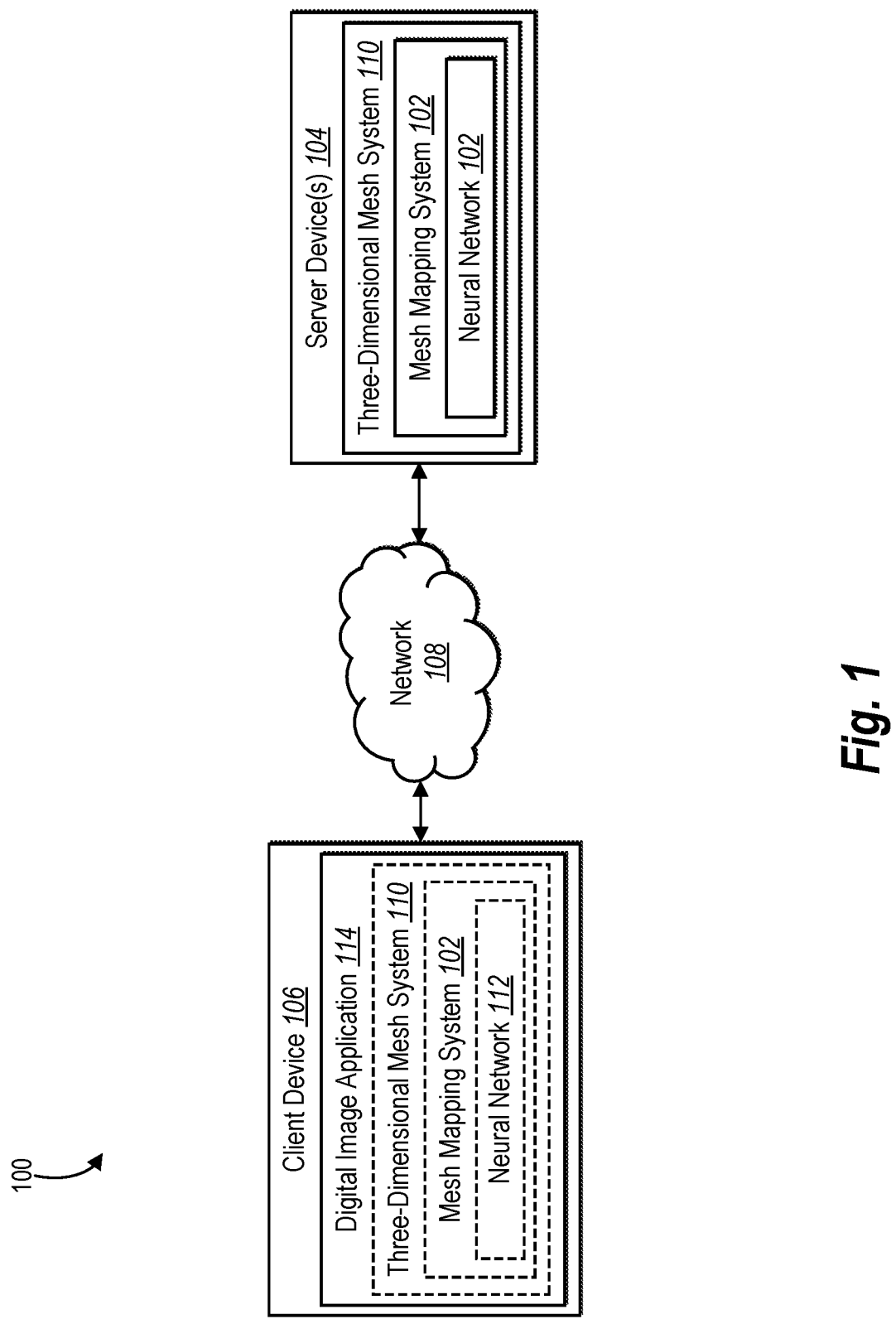
FIG. 1 illustrates an example system environment in which a mesh mapping system can operate in accordance with one or more implementations.

This disclosure describes one or more embodiments of a mesh mapping system that generates mappings of three-dimensional meshes utilizing a neural network. In one or more embodiments, the mesh mapping system utilizes a neural network to generate extrinsic matrices corresponding to a plurality of polygons of a three-dimensional mesh by processing the three-dimensional mesh via the neural network to induce a field of matrices over the polygons in ambient space. The mesh mapping system utilizes the extrinsic matrices to generate intrinsic matrices for the polygons by restricting the extrinsic matrices to tangent spaces of the corresponding polygons, resulting in a gradient field over the tangent spaces of the three-dimensional mesh. The mesh mapping system also utilizes a model (e.g., a Poisson model) to generate a mapping from the gradient field according to a differential operator corresponding to the three-dimensional mesh. In one or more embodiments, the mesh mapping system also generates a modified three-dimensional mesh including positions of vertices in the three-dimensional mesh based on the mapping.

As previously mentioned, in one or more embodiments, the mesh mapping system generates extrinsic matrices over an ambient space for a plurality of polygons of a three-dimensional mesh. For example, the mesh mapping system determines centroid features of triangles in a three-dimensional mesh. Additionally, in some embodiments, the mesh mapping system determines a global code that represents a shape of the three-dimensional mesh. The mesh mapping system utilizes the neural network to generate the matrices in the ambient space from concatenated values that combine the centroid features and the global code.

In one or more embodiments, the mesh mapping system determines a gradient field by generating intrinsic matrices over tangent spaces corresponding to polygons of a three-dimensional mesh. In particular, the mesh mapping system restricts an extrinsic matrix to a tangent space of a corresponding triangle to generate an intrinsic, restricted matrix. Additionally, in some embodiments, the mesh mapping system generates the restricted matrix by reducing the dimensionality of the extrinsic matrix.

According to one or more embodiments, the mesh mapping system generates a mapping of a three-dimensional mesh based on a gradient field of matrices. Specifically, the mesh mapping system utilizes a Poisson model to process the gradient field of restricted matrices via a differential operator (e.g., a Laplacian operator) corresponding to the three-dimensional mesh. For example, the mesh mapping system utilizes the Poisson model to generate the mapping indicating updated positions of vertices of the three-dimensional mesh according to the restricted matrices in the gradient field.

In additional embodiments, the mesh mapping system generates a modified three-dimensional mesh including vertices based on a mapping. To illustrate, the mesh mapping system utilizes the mapping to modify a shape of a three-dimensional mesh on which the mapping is based according to a target pose of the three-dimensional mesh. For example, the mesh mapping system generates the modified three-dimensional mesh by generating or moving a plurality of vertices of a three-dimensional mesh to a plurality of updated vertex positions based on transformations indicated by the mapping.

As mentioned, conventional three-dimensional modeling systems have a number of shortcomings in relation to flexibility and accuracy of operation. For example, some conventional modeling systems that provide predictive mapping generation of three-dimensional meshes attempt to address mapping challenges related to preserving detail in mappings use processes that function for a single, fixed triangulation. While such conventional systems can provide highly detailed mappings based on the fixed triangulation, the conventional systems are unable to accurately predict mappings for meshes in which a runtime triangulation is not provided in advance or for cases in which the training data includes diverse triangulations. Thus, the conventional systems are rigidly tied to the fixed triangulation and cannot be broadly applied to other triangulations.

Some conventional systems attempt to address issues related to variability of triangulation by defining deformations over an ambient three-dimensional space. In particular, by leveraging only ambient fields to generate mappings of three-dimensional meshes, the conventional systems rely on the neural networks to ensure that the predicted fields protect mesh details, which can require a significant amount of training and/or specialized neural networks. Additionally, some conventional systems select a subset of ambient space deformations, which are detail-preserving by construction, such as deformations induced by sparse rigs such as cages. These conventional systems rely on the rig to induce a highly restricted deformation space, which relies on accurate fitting of the rig to the mesh to provide the correct deformation subspace. Such conventional systems also lack flexibility due to the rigs being limited to applicability to different shapes or topologies.

The disclosed mesh mapping system provides a number of advantages over conventional systems. For example, the mesh mapping system improves the flexibility and accuracy of computing devices that implement three-dimensional modeling. In contrast to conventional systems that use models tied to a specific, fixed triangulation, the mesh mapping system utilizes a neural network that is triangulation agnostic. Specifically, by utilizing a neural network to generate a set of extrinsic matrices in an ambient space that retains shape information for a given three-dimensional mesh, the mesh mapping system provides flexible application of the neural network to a variety of different three-dimensional mesh shapes.

Furthermore, in contrast to conventional systems that fail to provide detail-preserving mappings due to operating in ambient space, the mesh mapping system retains fine-grained mesh details. In particular, the mesh mapping system generates detail-preserving mappings by restricting an extrinsic field of linear transformations in the ambient space to an intrinsic field of linear transformations in the tangent spaces of corresponding triangles/polygons of a three-dimensional mesh. The mesh mapping system further retains greater detail during mesh transformations via the use of a Poisson model that leverages a differential operator specific to the three-dimensional model. Thus, the mesh mapping system utilizes a neural network-based model to provide flexible and accurate mesh mappings that are agnostic to the specific triangulations of the three-dimensional meshes while also preserving greater detail in the three-dimensional meshes than conventional systems.

Furthermore, given that most mesh mappings in practical applications vary gradually across corresponding input shapes, the resulting Jacobian fields (e.g., intrinsic gradient fields) are low-frequency, smooth signals. The mesh mapping system leverages this concept to train neural networks to map points in three-dimensional space to the Jacobian fields. This allows the mesh mapping system to exploit the smoothness of the signals for reproducing the Jacobian fields with high accuracy without exceeding the capacity of the neural networks for such practical applications of mesh mappings.

Turning now to the figures, FIG. 1 includes an embodiment of a system environment 100 in which a mesh mapping system 102 is implemented. In particular, the system environment 100 includes server device(s) 104 and a client device 106 in communication via a network 108. Moreover, as shown, the server device(s) 104 include a three-dimensional mesh system 110, which includes the mesh mapping system 102. FIG. 1 illustrates that the mesh mapping system 102 also includes a neural network 112. Additionally, the client device 106 includes a digital image application 114, which optionally includes the three-dimensional mesh system 110 and the mesh mapping system 102, which further includes the neural network 112.

As used herein, the term "neural network" refers to one or more computer algorithms that can be tuned (e.g., trained) based on inputs to approximate unknown functions. In particular, a neural network can include a machine-learning model that utilizes algorithms to learn from, and make determinations on, known data by analyzing the known data to learn to generate outputs that reflect patterns and attributes of the known data. For instance, a neural network can include, but is not limited to, a multilayer perceptron or a convolutional neural network. A neural network can learn high-level abstractions in data to generate data-driven determinations, predictions, or decisions from the known input data. Furthermore, as described herein, a "neural network" can include a plurality of parallel layers (e.g., a plurality of multilayer perceptron layers) for generating predicted matrices in an ambient space based on a three-dimensional mesh.

As shown in FIG. 1, the server device(s) 104 includes or host the three-dimensional mesh system 110. The three-dimensional mesh system 110 include, or be part of, one or more systems that implement modeling and rendering of objects and/or scenes in a digital, three-dimensional environment. For example, the three-dimensional mesh system 110 provides tools for viewing, generating, editing, and/or otherwise interacting with three-dimensional meshes within digital three-dimensional environments. To illustrate, the three-dimensional mesh system 110 communicates with the client device 106 via the network 108 to provide the tools for display and interaction via the digital image application 114 at the client device 106.

The three-dimensional mesh system 110 uses the three-dimensional meshes in a variety of applications such as databases of three-dimensional assets, virtual or augmented reality environments, or other environments that utilize three-dimensional models. For example, as used herein, the term "three-dimensional mesh" refers to a digital representation of an object in three dimensions. For example, a three-dimensional mesh includes a collection of vertices, edges, and faces that define the shape of the object in three dimensions. Specifically, a three-dimensional mesh includes a number of vertices (or individual points) that connect to form edges, which then define faces representing a surface of the object.

In some embodiments, the three-dimensional mesh system 110 receives interaction data for viewing, generating, or editing a three-dimensional mesh from the client device 106, processes the interaction data (e.g., to view, generate, or edit a three-dimensional mesh), and provides the results of the interaction data to the client device 106 for display via the digital image application 114 or to a third-party system. Additionally, in some embodiments, the three-dimensional mesh system 110 receives data from the client device 106 in connection with editing three-dimensional meshes, including requests to access three-dimensional meshes or digital source images stored at the server device(s) 104 (or at another device such as a source repository) and/or requests to store three-dimensional meshes from the client device 106 at the server device(s) 104 (or at another device).

In connection with providing tools for interacting with three-dimensional meshes, the three-dimensional mesh system 110 utilizes the mesh mapping system 102 to generate mappings for three-dimensional meshes and/or to generate modified three-dimensional meshes. For example, the three-dimensional mesh system 110 obtains a three-dimensional mesh from the client device 106 or other system and uses the mesh mapping system 102 to generate a mapping for the three-dimensional mesh. In particular, the mesh mapping system 102 utilizes the neural network 112 to process the three-dimensional mesh in connection with generating the mapping for modifying a pose of the three-dimensional mesh. Additionally, in some embodiments, the mesh mapping system 102 utilizes the mapping to generate a modified three-dimensional mesh.

In one or more embodiments, in response to utilizing the mesh mapping system 102 to generate a mapping and/or a modified three-dimensional mesh, the three-dimensional mesh system 110 provides the resulting mapping and/or modified three-dimensional mesh to the client device 106 for display. For instance, the three-dimensional mesh system 110 sends the mapping and/or modified three-dimensional mesh to the client device 106 via the network 108 for display via the digital image application 114. Additionally, in some embodiments, the client device 106 receives additional inputs to apply additional changes to the three-dimensional mesh (e.g., based on additional inputs to further modify the three-dimensional mesh to a new target pose). The client device 106 sends a request to apply the additional changes to the three-dimensional mesh to the three-dimensional mesh system 110, and the three-dimensional mesh system 110 utilizes the mesh mapping system 102 to update the three-dimensional mesh.

In one or more embodiments, the server device(s) 104 include a variety of computing devices, including those described below with reference to FIG. 13. For example, the server device(s) 104 includes one or more servers for storing and processing data associated with three-dimensional meshes. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., three-dimensional meshes in three-dimensional environments). In some embodiments, the client device 106 also performs functions for generating, capturing, or accessing data to provide to the three-dimensional mesh system 110 and the mesh mapping system 102 in connection with generating or editing three-dimensional meshes. For example, the client device 106 communicates with the server device(s) 104 via the network 108 to provide information (e.g., user interactions) associated with three-dimensional meshes. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 13.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the mesh mapping system 102 being implemented by a particular component and/or device within the system environment 100, the mesh mapping system 102 can be implemented, in whole or in part, by other computing devices and/or components in the system environment 100 (e.g., the client device 106).

In particular, in some implementations, the mesh mapping system 102 on the server device(s) 104 supports the mesh mapping system 102 on the client device 106. For instance, the server device(s) 104 generates the mesh mapping system 102 (including the neural network 112) for the client device 106. The server device(s) 104 trains and provides the mesh mapping system 102 and the neural network 112 to the client device 106 for performing a mesh mapping process at the client device 106. In other words, the client device 106 obtains (e.g., downloads) the mesh mapping system 102 and the neural network 112 from the server device(s) 104. At this point, the client device 106 is able to utilize the mesh mapping system 102 and the neural network 112 to generate mappings of three-dimensional meshes and modified three-dimensional meshes independently from the server device(s) 104.

In alternative embodiments, the mesh mapping system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform mesh mapping and/or mesh generation operations, and, in response, the mesh mapping system 102 or the three-dimensional mesh system 110 on the server device(s) 104 performs operations to generate and/or edit three-dimensional meshes. The server device(s) 104 provide the output or results of the operations to the client device 106.

Figure 2:
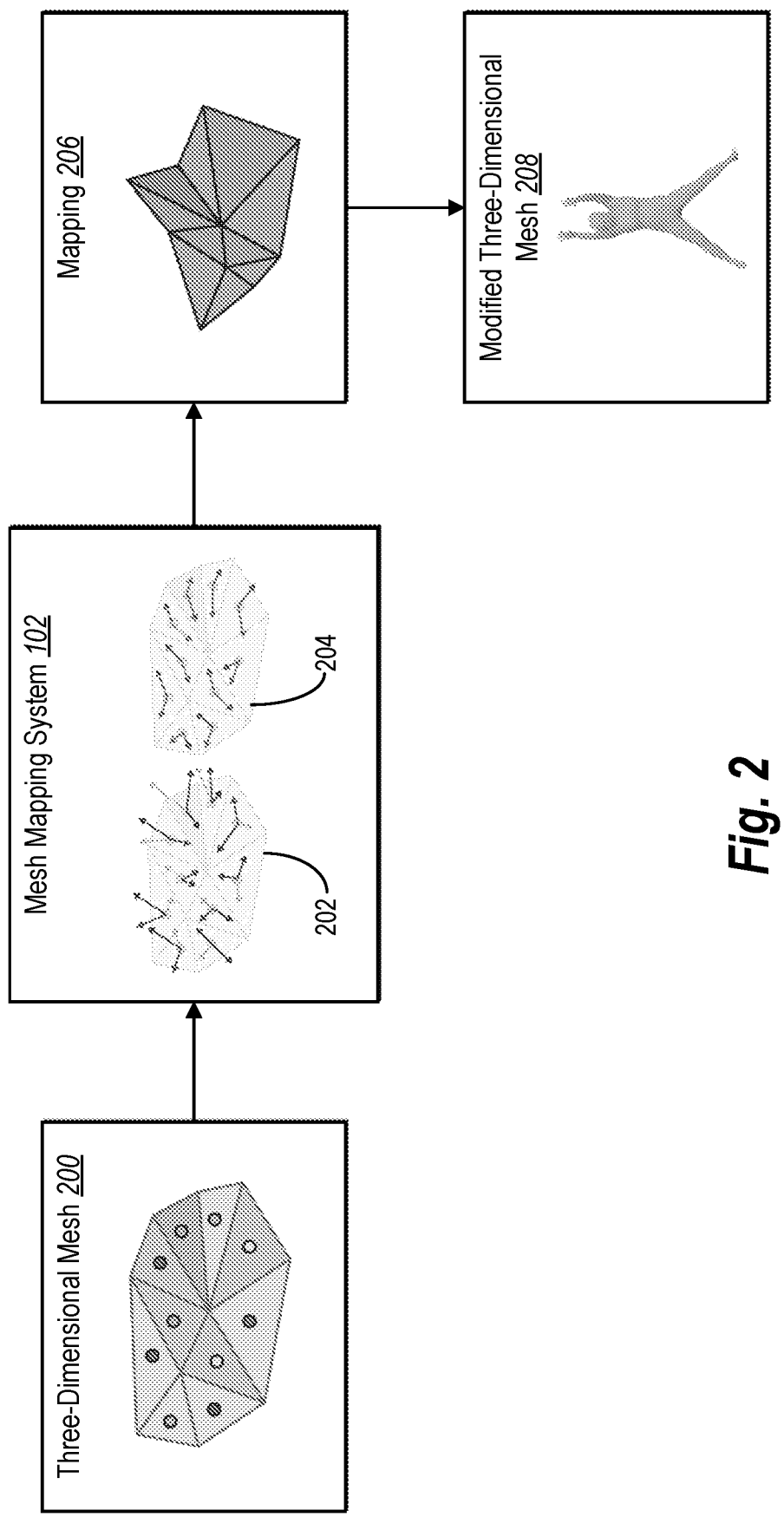
FIG. 2 illustrates a diagram of the mesh mapping system generating a three-dimensional mesh based on a mapping in accordance with one or more implementations.

As mentioned, the mesh mapping system 102 generates mappings of three-dimensional meshes. FIG. 2 illustrates an overview of the mesh mapping system 102 generating a mapping of a three-dimensional mesh via extrinsic and intrinsic matrices of polygons of the three-dimensional mesh. FIG. 2 also illustrates that the mesh mapping system 102 generates a modified three-dimensional mesh based on the mapping.

In one or more embodiments, as illustrated in FIG. 2, the mesh mapping system 102 identifies a three-dimensional mesh 200 including a plurality of polygons. In various embodiments, the three-dimensional mesh 200 includes a human model, an animal model, or a model of any object in three-dimensional space. For example, the three-dimensional mesh 200 includes a three-dimensional shape that includes a plurality of triangles formed by a plurality of vertices connected by a plurality of edges. In alternative embodiments, the three-dimensional mesh 200 includes a three-dimensional shape that includes a plurality of tetrahedrons or quadrangles formed by a plurality of vertices and edges.

Figure 3:
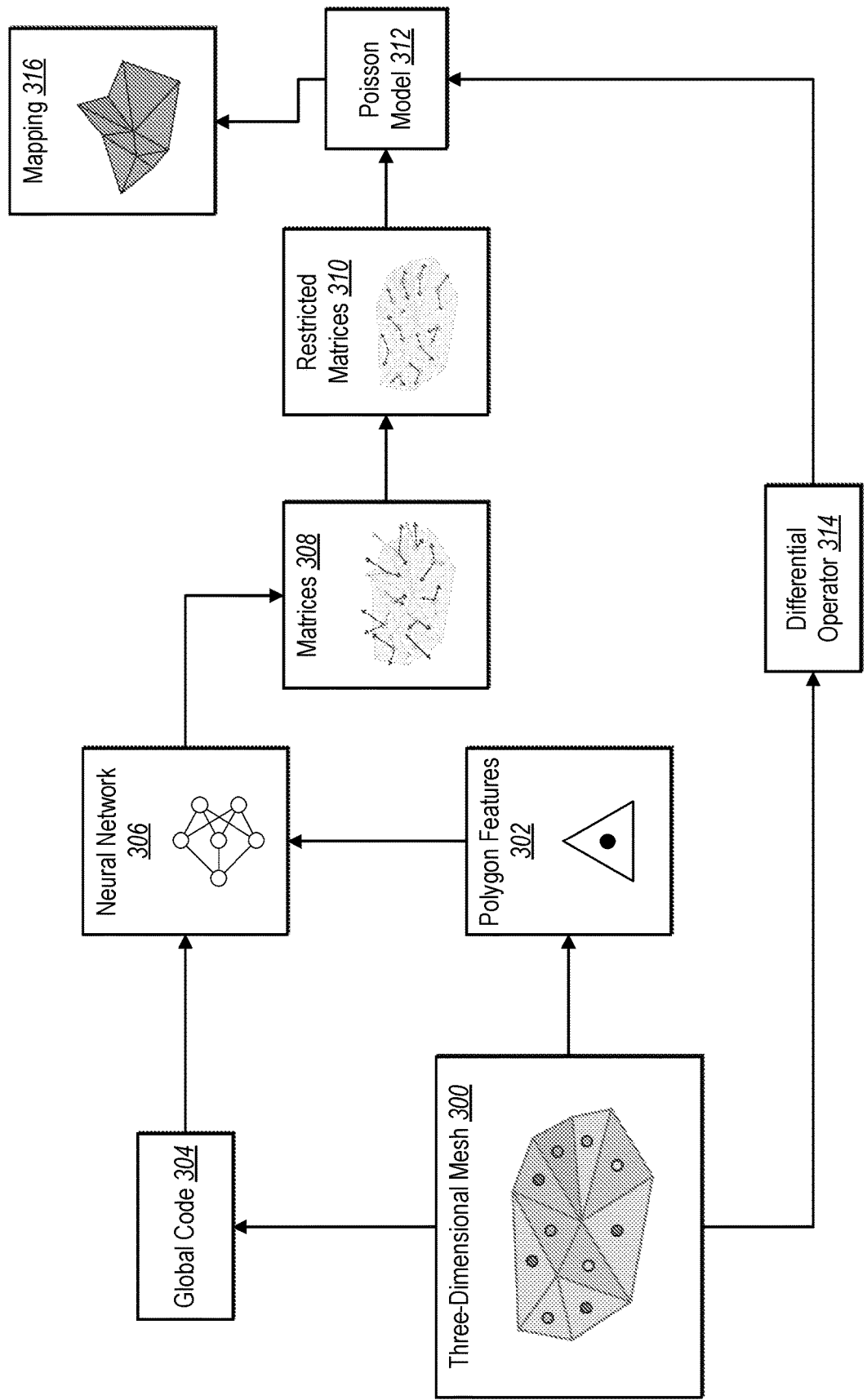
FIG. 3 illustrates a diagram of an overview of the mesh mapping system utilizing a neural network and a mesh-based differential operator to generate a mapping of a three-dimensional mesh in accordance with one or more implementations.
Figure 4:
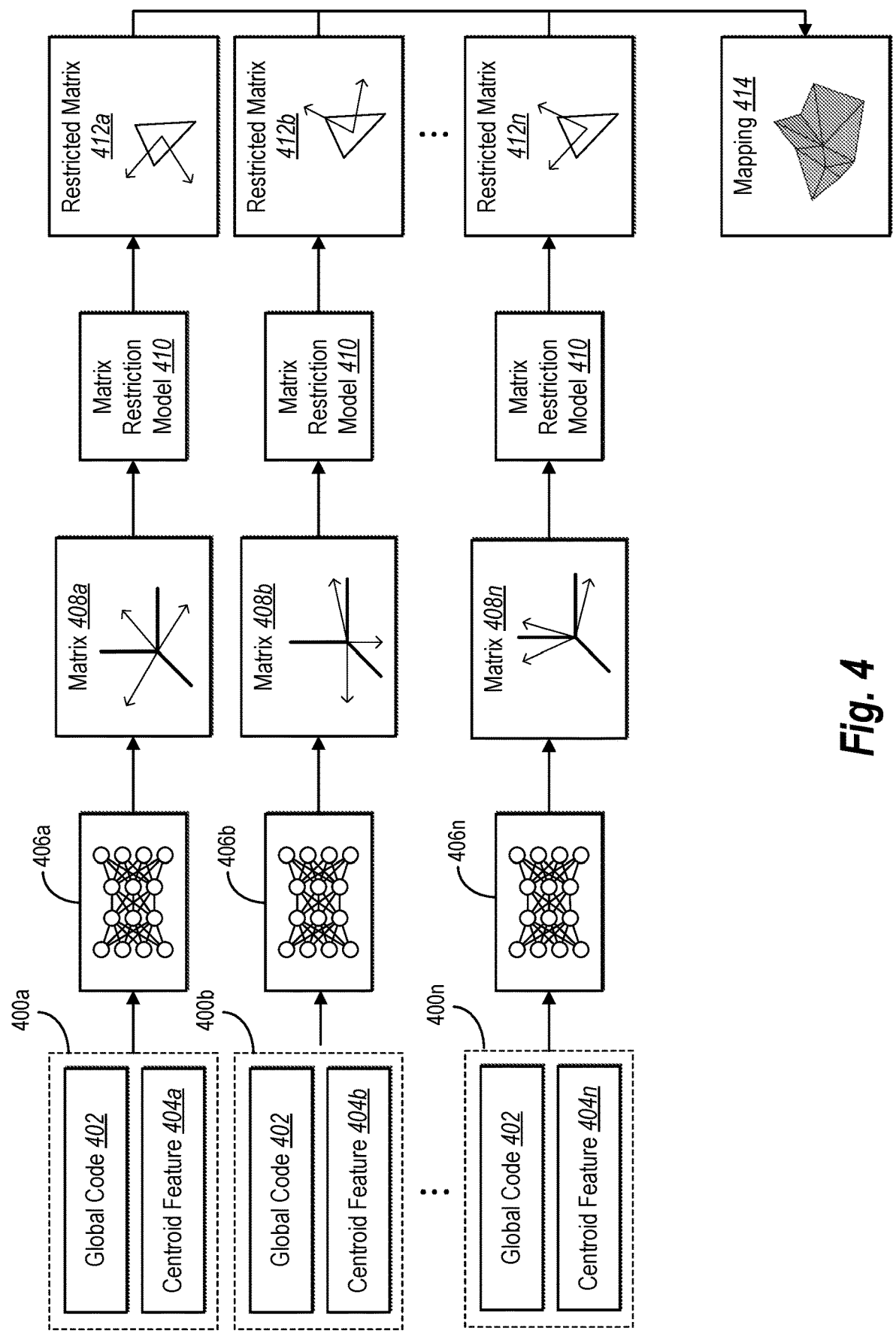
FIG. 4 illustrates a diagram of the mesh mapping system generating a plurality of restricted matrices for polygons of a three-dimensional mesh in accordance with one or more implementations.

FIG. 2 further illustrates that the mesh mapping system 102 processes the three-dimensional mesh 200 utilizing a neural network to extract a set of matrices 202 in ambient space corresponding to polygons of the three-dimensional mesh 200. The mesh mapping system 102 also restricts the set of matrices 202 to tangent spaces of the polygons of the three-dimensional mesh 200, resulting in a set of restricted matrices 204. FIGS. 3 and 4 and the corresponding description provide additional detail with respect to the process of generating and restricting matrices for a plurality of polygons in a three-dimensional mesh.

FIG. 2 also illustrates that the mesh mapping system 102 utilizes the set of restricted matrices 204 to generate a mapping 206 of the three-dimensional mesh 200. As used herein, the term "mapping" refers to a plurality of values indicating translation/transformation of a plurality of vertices of a multi-dimensional mesh from a first position in a multi-dimensional space to a second position in a multi-dimensional space. For example, a mapping corresponds to movement of one or more portions of a three-dimensional mesh from one position to another position in the same three-dimensional space. To illustrate, a mapping includes a re-posing of a three-dimensional mesh from a first pose to a second pose, such as changing relative positions of limbs of a three-dimensional human model. In additional embodiments, a mapping includes translation values for generating a UV parameterization from a three-dimensional mesh (e.g., for texturing). A mapping alternatively includes translation values for modifying a two-dimensional mesh in a two-dimensional space.

In relation to FIG. 2, the mesh mapping system 102 utilizes a Poisson model to generate the mapping 206 from the set of restricted matrices 204 according to one or more differential operators associated with the three-dimensional mesh 200. As used herein, the term "differential operator" refers to an operation that takes as input a function and returns a function as a result. For example, a differential operator includes a Laplacian operator and/or a gradient operator corresponding to a three-dimensional mesh. Accordingly, in one or more embodiments, the mesh mapping system determines a mesh-specific Laplacian operator and/or a mesh-specific gradient operator for each three-dimensional mesh. Furthermore, as used herein, the term "Poisson model" refers to a computing application that utilizes an algorithm to generate a mapping of a three-dimensional mesh according to a differential operator. FIGS. 3 and 4 and the corresponding description provide additional detail with respect to generating a mapping for a three-dimensional mesh.

Figure 6:
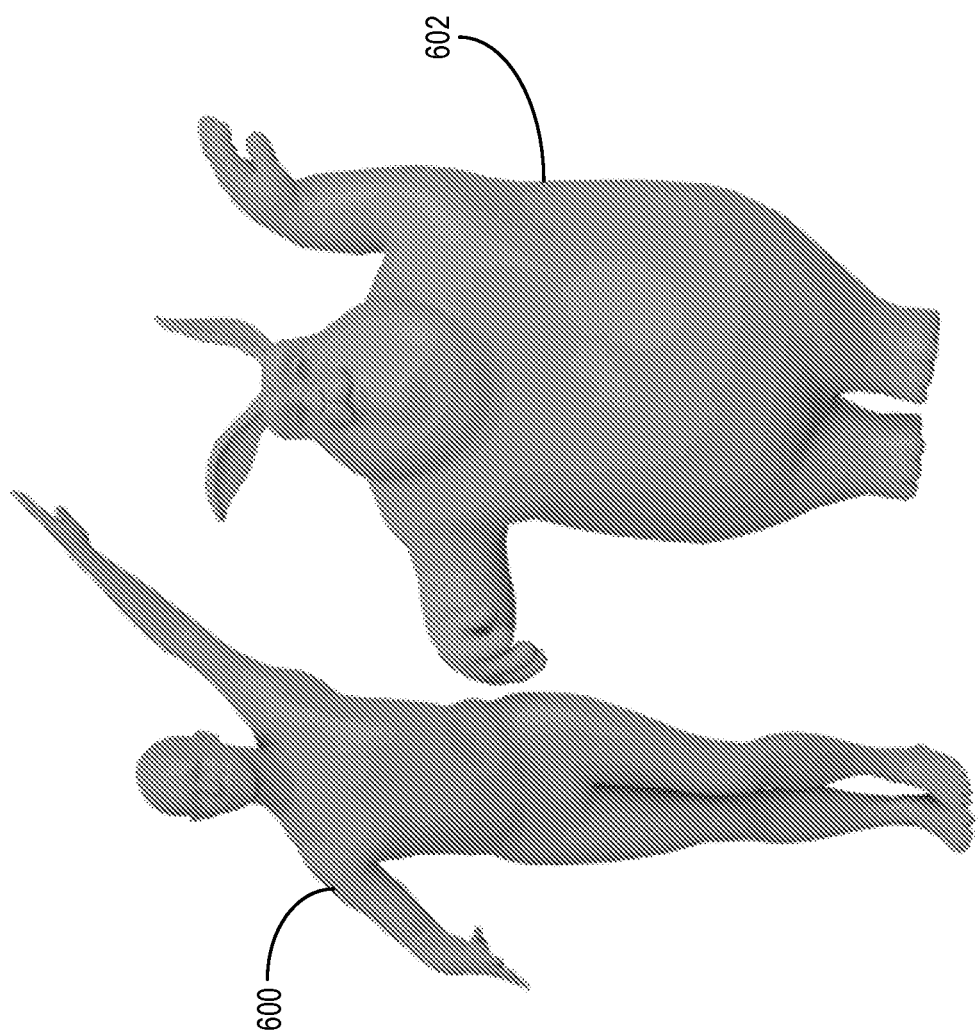
FIG. 6 illustrates a diagram of three-dimensional meshes in poses based on a mapping in accordance with one or more implementations.
Figure 7:
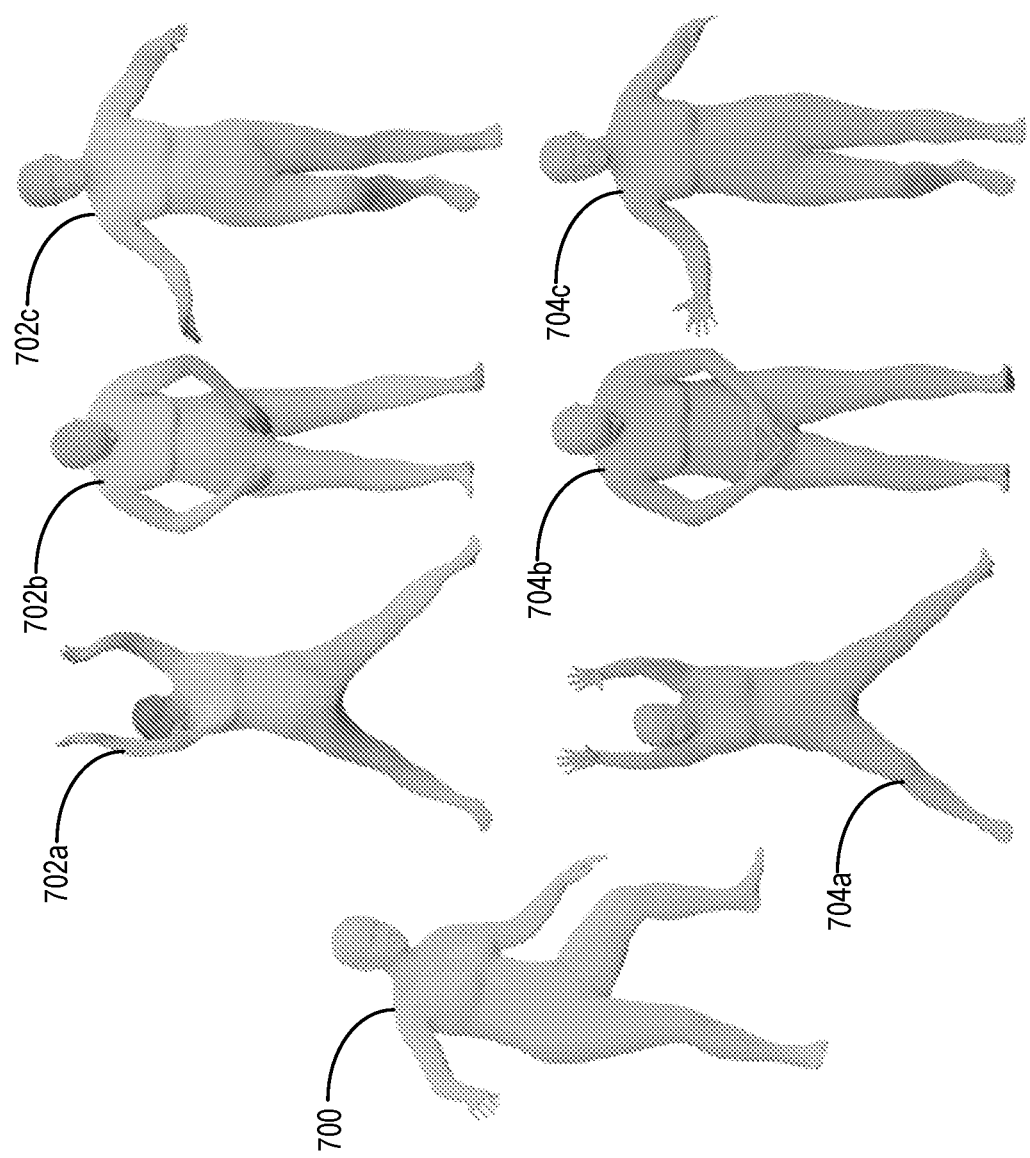
FIG. 7 illustrates a diagram of target three-dimensional meshes and generated three-dimensional meshes from a base three-dimensional mesh in accordance with one or more implementations.
Figure 8:
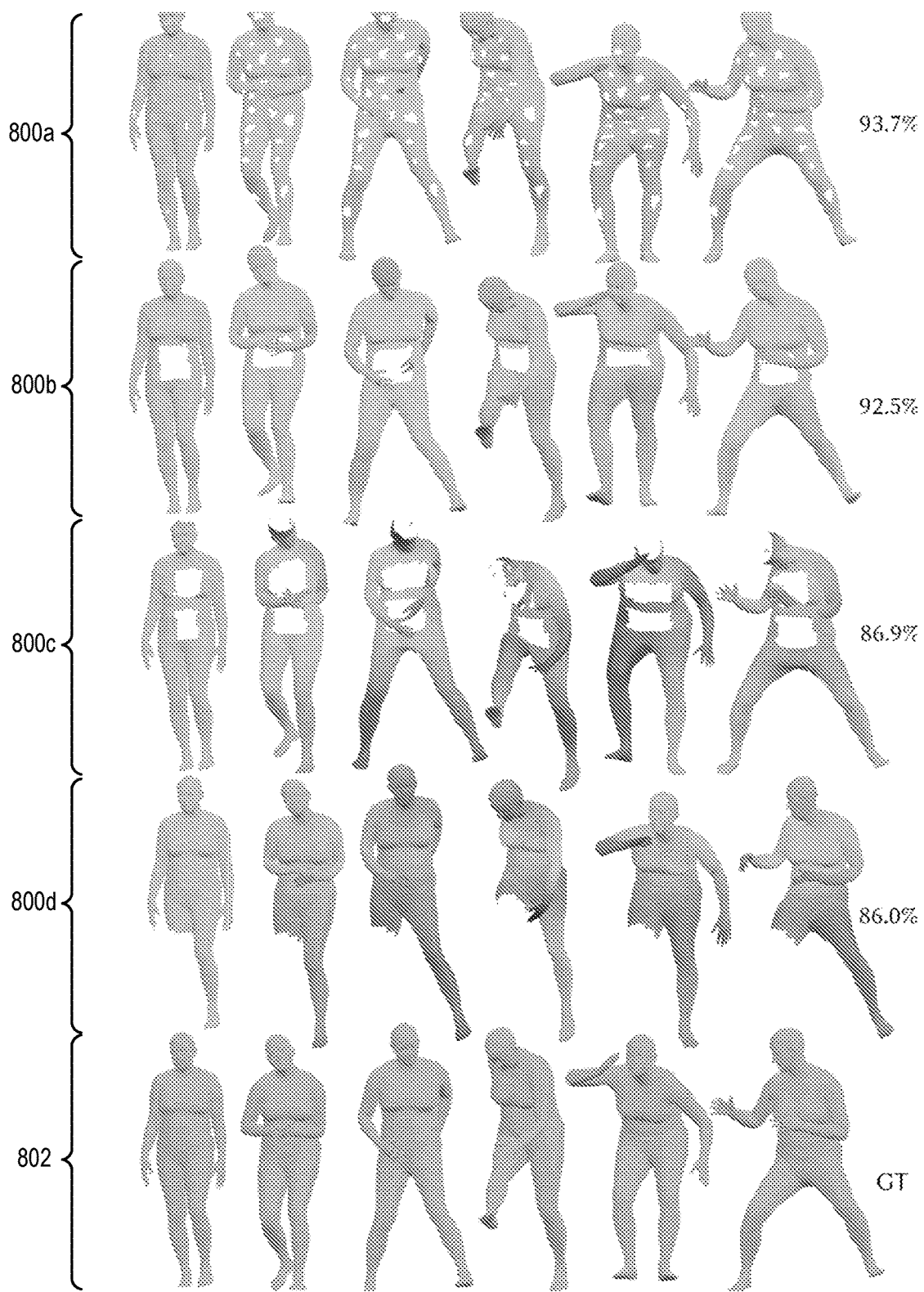
FIG. 8 illustrates a diagram of three-dimensional meshes registered from partial three-dimensional meshes in accordance with one or more implementations.

FIG. 2 further illustrates that the mesh mapping system 102 generates a modified three-dimensional mesh 208 based on the mapping 206. For example, the mesh mapping system 102 utilizes indications of translations of vertices from the three-dimensional mesh 200 to generate the modified three-dimensional mesh 208 including vertices at updated positions. FIGS. 6-8 and the corresponding descriptions provide additional detail with respect to the mesh mapping system 102 generating modified three-dimensional meshes based on generated mappings.

FIG. 3 illustrates a detailed diagram of a process in which the mesh mapping system 102 generates a mapping of a three-dimensional mesh based on neural network-generated matrices. In particular, FIG. 3 illustrates that the mesh mapping system 102 utilizes features of individual polygons to determine matrices corresponding to the polygons and construct the mapping based on the matrices. Additionally, as previously mentioned, the mesh mapping system 102 generates matrices for mesh polygons in ambient space and in corresponding tangent spaces to ensure that the resulting mapping is triangulation agnostic while preserving fine-grained details from the original mesh.

In one or more embodiments, as illustrated in FIG. 3, the mesh mapping system 102 determines a three-dimensional mesh 300. For example, the three-dimensional mesh 300 includes a plurality of triangular faces formed by a plurality of vertices and edges creating a model in three-dimensional space. Additionally, in one or more embodiments, each vertex in the three-dimensional mesh 300 includes a three-dimensional position (e.g., values along an x-axis, a y-axis, and a z-axis) in a three-dimensional space. In some embodiments, the vertices of the three-dimensional mesh 300 also include additional attributes such as one or more edges connecting the vertex to one or more other vertices, a vertex normal, or a color.

For instance, as used herein, the term "vertex" refers to an individual point within a three-dimensional mesh that connects to other vertices in the three-dimensional mesh to form a surface. Additionally, as used herein, the term "edge" refers to a connecting line between two vertices within a three-dimensional mesh. Furthermore, as used herein, the term "polygon" refers to a face formed by three or more edges (and therefore, three or more vertices) within a three-dimensional mesh. As an example, a three-dimensional triangle mesh includes vertices that define triangular faces (i.e., triangles) representing the surface of the object. A computing device can then render a three-dimensional mesh by rendering lines for edges and/or the faces.

According to one or more embodiments, the mesh mapping system 102 determines polygon features 302 based on the three-dimensional mesh 300. Specifically, the mesh mapping system 102 utilizes one or more attributes of the faces of the polygons in the three-dimensional mesh 300 to determine the polygon features 302. For instance, the mesh mapping system 102 determines attributes of the triangular faces of the three-dimensional mesh 300, including, but not limited to, a position, shape, and/or normal of each triangular face within the three-dimensional space.

As used herein, the term "feature" refers to one or more attributes of a polygon in a three-dimensional mesh. For example, a feature includes a centroid feature of a centroid (or center point) polygon based on a shape, position, and/or orientation of the polygon or centroid of the polygon within a three-dimensional environment. In one or more embodiments, a feature includes a concatenated value, an encoded feature vector, or other value representing the attributes of the centroid and/or polygon.

To illustrate, the mesh mapping system 102 determines a triangle formed by a plurality of vertices and edges in the three-dimensional mesh 300. The mesh mapping system 102 determines a centroid feature of the triangle by determining a three-dimensional position of a centroid (or center point) of the triangle in three-dimensional space and a normal of the centroid. To illustrate, the mesh mapping system 102 determines the normal of the centroid based on an orientation and direction of the triangle in the three-dimensional space.

In additional embodiments, the mesh mapping system 102 determines a shape encoding of the centroid. For example, the mesh mapping system 102 generates the shape encoding of the centroid based on a position of the centroid relative to vertices that form the triangle (e.g., utilizing a neural network encoder) to encode position and shape information associated with the centroid and triangle. In another example, the mesh mapping system 102 determines a Wave-Kernel signature encoding of the centroid to characterize the centroid of a triangle, as described by Mathieu Aubry, Ulrich Schilckewei, and Daniel Cremers in "The wave kernel signature: A quantum mechanical approach to shape analysis," in ICCV (2011), which is incorporated herein by reference in its entirety. Specifically, the Wave-Kernel signature includes a descriptor that provides a high-level understanding of a particular geometry.

In one or more embodiments, the mesh mapping system 102 determines the polygon features 302 by combining the determined features for a centroid of a corresponding polygon. In particular, the mesh mapping system 102 generates a centroid feature representing a centroid of a polygon by concatenating the features into a concatenated value. In at least some instances, the mesh mapping system 102 generates the concatenated value as a vector of values corresponding to the centroid. In additional instances, the mesh mapping system 102 generates the centroid feature by utilizing a neural network to encode the attributes of the centroid of the polygon as an encoded centroid feature.

In some embodiments, the mesh mapping system 102 converts the three-dimensional mesh 300 into a triangular mesh prior to determining the polygon features 302. For instance, the mesh mapping system 102 converts a quadrangular mesh into a triangular mesh by dividing the quadrangles into a plurality of triangles. Alternatively, the mesh mapping system 102 converts a three-dimensional mesh into a triangular mesh by remapping a plurality of vertices to a surface of the three-dimensional mesh based on existing vertices/surfaces of the three-dimensional mesh. Furthermore, in some embodiments, the mesh mapping system 102 determines polygon features of a tetrahedron by determining a centroid of the tetrahedron and then concatenating features of the centroid of the tetrahedron (e.g., according to a volume of the tetrahedron).

In additional embodiments, the mesh mapping system 102 determines a global code 304 corresponding to the three-dimensional mesh 300. Specifically, the mesh mapping system 102 determines the global code 304 including a vector that represents a target shape of the three-dimensional mesh 300 or a target pose associated with the three-dimensional mesh 300. For example, the mesh mapping system 102 determines the global code 304 including a representation of a plurality of angles of joints of the three-dimensional mesh 300 (e.g., joint angles for an underlying skeletal structure of the three-dimensional mesh 300). To illustrate, the mesh mapping system 102 obtains the global code 304 from a previously generated database of encodings representing target shapes or poses for the three-dimensional mesh 300 or other three-dimensional meshes (e.g., based on skinned multi-person linear model pose parameters). Alternatively, the mesh mapping system 102 generates the global code 304 in real-time in connection with determining a target shape/pose for the three-dimensional mesh 300, such as by generating an encoding of a shape based on a point cloud sampled (e.g., 1024 randomly sampled points) from the three-dimensional mesh 300 and point descriptors of the sampled points (e.g., Wave-Kernel signatures of the sampled points).

In alternative embodiments, the mesh mapping system 102 utilizes a different indicator of a target pose or shape for mapping a three-dimensional mesh. For example, the mesh mapping system 102 can determining a digital image depicting an object corresponding to a target pose or shape. In some instances, the mesh mapping system 102 determines a set of parameters directly defining specific properties of a target pose or shape (e.g., a set of angles, rotation/translation values, or other parameters).

According to one or more embodiments, the mesh mapping system 102 utilizes a neural network 306 to process the polygon features 302 and the global code 304 to generate matrices 308 corresponding to the polygons. In particular, the mesh mapping system 102 utilizes the neural network 306 to generate, for each triangle (or other polygon) of the three-dimensional mesh 300, a matrix representing one or more translation values corresponding to vertices of the triangle according to the target shape/pose. More specifically, in one or more embodiments, the neural network 306 generates a matrix in ambient space for a polygon based on the global code and a centroid feature corresponding to the polygon. The mesh mapping system 102 utilizes the neural network 306 to generate the matrices 308 in ambient space corresponding to all polygons (or a selected subset of polygons) in the three-dimensional mesh 300.

As used herein, the term "matrix" refers to a plurality of values indicating a position, vector, or feature in a multi-dimensional space. For instance, an "extrinsic matrix" refers to a 3×3 vector in an ambient three-dimensional space, which is a dimensional space corresponding to an area surrounding a three-dimensional mesh in a three-dimensional environment. Additionally, an "intrinsic matrix" or "restricted matrix" refers to a 3×2 vector in a tangent space, which is a dimensional space of a plane corresponding to a polygon of a three-dimensional mesh. Additionally, a "gradient field" refers to a collection of matrices corresponding to a plurality of polygons of a three-dimensional mesh.

In one or more embodiments, the mesh mapping system 102 includes a multilayer perceptron with a plurality of layers that makes predictions of 3×3 matrices of polygons in parallel that induce an extrinsic field over the ambient space. For example, multilayer perceptron includes a five-layer, fully-connected multilayer perceptron neural network with rectified linear unit activation and group normalization after each layer. To illustrate, the mesh mapping system 102 utilizes the multilayer perceptron to generate an extrinsic matrix based on a single point in space (e.g., a centroid or centroid feature concatenated with the global code 304). The generated matrix thus represents a point-wise prediction that combine with other matrices for additional polygons (e.g., via corresponding centroids) to result in an extrinsic field of linear transformations of vertices of the three-dimensional mesh 300.

According to one or more additional embodiments, the mesh mapping system 102 modifies the matrices 308 from the ambient space to localized tangent spaces of polygons of the three-dimensional mesh 300. In particular, the mesh mapping system 102 generates restricted matrices 310 by restricting the matrices 308 from the ambient space to tangent spaces corresponding to the polygons. For example, the mesh mapping system 102 restricts a matrix by reducing a dimensionality of the matrix from a 3×3 matrix in the ambient space to a 3×2 matrix in the tangent space of a corresponding polygon. To illustrate, the mesh mapping system 102 determines two orthogonal vectors (e.g., arbitrarily chosen) having unit length to determine a frame spanning the tangent space for the polygon, in which the tangent space is orthogonal to the normal of the polygon.

In connection with generating the restricted matrices 310 of the polygons for the three-dimensional mesh 300, the mesh mapping system 102 generates a gradient field representing a combination of the restricted matrices 310. For instance, the mesh mapping system 102 generates an intrinsic field of gradients (e.g., a Jacobian field) that includes linear transformations of 3×2 dimensions in the tangent spaces of the polygons to the three-dimensional space. More specifically, a gradient field includes a linear portion of transformations restricted to the corresponding triangles in the corresponding frames of the tangent spaces.

In one or more embodiments, in response to determining the restricted matrices 310, the mesh mapping system 102 provides the restricted matrices 310 to a Poisson model 312. For example, the Poisson model 312 includes a system that utilizes an algorithm for solving a Poisson problem defined via a differential operator 314 that corresponds to the three-dimensional mesh 300. The mesh mapping system 102 utilizes the Poisson model 312 to generate a mapping 316 corresponding to the three-dimensional mesh 300 to indicate a plurality of linear transformations of vertices in the three-dimensional mesh 300 to a plurality of updated positions of the vertices (e.g., for generating a modified three-dimensional mesh).

In some embodiments, the mesh mapping system 102 determines the Poisson model 312 based on one or more differential operators that correspond to the three-dimensional mesh 300. For example, the mesh mapping system 102 determines the differential operator 314 to include a Laplacian operator that corresponds to the three-dimensional mesh 300. In additional embodiments, the mesh mapping system 102 also determines the differential operator 314 to include a gradient operator, which may be triangle/polygon specific. Accordingly, in such embodiments, the mesh mapping system 102 leverages the Laplacian operator and the gradient operator corresponding to the mesh construction (e.g., triangulation) of the three-dimensional mesh 300 to determine the Poisson model 312.

In one or more embodiments, as previously mentioned, the mesh mapping system 102 can utilize the mapping 316 to generate a modified three-dimensional mesh. In particular, the mesh mapping system 102 utilizes the mapping 316 to generate a modified three-dimensional mesh including changing positions of one or more portions of the three-dimensional mesh 300 via updated positions of corresponding vertices. Additionally, in some instances, the mesh mapping system 102 utilizes the mapping 316 to generate a modified three-dimensional mesh with a global translation of the three-dimensional mesh.

As mentioned, in one or more embodiments, the mesh mapping system 102 utilizes a neural network to generate a plurality of matrices corresponding to polygons of a three-dimensional mesh in parallel. FIG. 4 illustrates an example in which the mesh mapping system 102 processes matrices for polygons in parallel. Specifically, FIG. 4 illustrates that the mesh mapping system 102 generates extrinsic matrices in parallel. FIG. 4 further illustrates that the mesh mapping system 102 also generates intrinsic matrices (e.g., restricted matrices) based on the extrinsic matrices in parallel. Accordingly, the mesh mapping system 102 efficiently and quickly determines a mapping for a three-dimensional mesh via a plurality of parallel operations.

As illustrated in FIG. 4, the mesh mapping system 102 determines a plurality of sets of input features 400a-400n corresponding to polygons of a three-dimensional mesh. In particular, the mesh mapping system 102 determines a first set of input features 400a corresponding to a first polygon (e.g., a first triangle), a second set of input features 400b corresponding to a second polygon, etc. In one or more embodiments, as illustrated, the first set of input features 400a includes a global code 402 corresponding to a three-dimensional mesh and a centroid feature 404a corresponding to the first polygon. Additionally, the second set of input features 400b also includes the global code 402 and a centroid feature 404b corresponding to the second polygon. Accordingly, the sets of input features 400a-400n each includes the global code 402 and a different centroid feature for the corresponding polygon.

In connection with determining the sets of input features 400a-400n, the mesh mapping system 102 provides the sets of input features 400a-400n to a neural network. In one or more embodiments, the mesh mapping system 102 utilizes a plurality of neural network instances 406a-406n. According to one or more embodiments, the neural network instances 406a-406n include a plurality of separate instances of a trained multilayer perceptron. As illustrated in FIG. 4, the neural network instances 406a-406n operate in parallel to process the sets of input features 400a-400n corresponding to a plurality of different polygons of a three-dimensional mesh.

In response to processing the sets of input features 400a-400n via the neural network instances 406a-406n, FIG. 4 illustrates that the mesh mapping system 102 utilizes the neural network instances 406a-406n to generate matrices 408a-408n corresponding to the polygons of the three-dimensional mesh in parallel. For instance, the mesh mapping system 102 generates a first matrix 408a utilizing a first neural network instance 406a, a second matrix 408b utilizing a second neural network instance 406b, etc. Each of the matrices 408a-408n represents an extrinsic linear transformation for the vertices of the corresponding polygon in ambient space (e.g., via transformations of the corresponding centroids). By generating the matrices 408a-408n in parallel, the mesh mapping system 102 can improve the efficiency of one or more computing devices (e.g., a GPU) processing the three-dimensional mesh in connection with rendering a modified three-dimensional mesh.

Furthermore, as previously mentioned, the mesh mapping system 102 generates restricted matrices 412a-412n in ambient space to tangent spaces of corresponding polygons. Specifically, as illustrated in FIG. 4, the mesh mapping system 102 provides the matrices 408a-408n to a matrix restriction model 410. For instance, the mesh mapping system 102 utilizes the matrix restriction model 410 to convert 3×3 matrices in ambient space to the tangent spaces. To illustrate, the mesh mapping system 102 utilizes the matrix restriction model 410 to generate a first restricted matrix 412a based on the first matrix 408a, a second restricted matrix 412b based on the second matrix 408b, etc., in parallel. In some embodiments, the mesh mapping system 102 utilizes a plurality of instances of the matrix restriction model 410 to generate the restricted matrices 412a-412n.

In one or more embodiments, the mesh mapping system 102 generates a mapping 414 from the restricted matrices 412a-412n. In particular, in response to generating the restricted matrices 412a-412n in parallel, the mesh mapping system 102 generates the mapping 414 including a plurality of linear transformations for points in a three-dimensional mesh. In some embodiments, the mesh mapping system 102 utilizes the mapping 414 to generate a modified three-dimensional mesh including updated positions of vertices according to the linear transformations.

Although FIG. 4 illustrates an embodiment in which the mesh mapping system 102 generates matrices from a plurality of polygons in a three-dimensional mesh in parallel, in alternative embodiments, the mesh mapping system 102 generates the matrices in a different manner. For example, the mesh mapping system 102 utilizes a single neural network to generate the matrices in series. Furthermore, the mesh mapping system 102 can similarly generate the restricted matrices from the matrices in series or in parallel.

According to one or more embodiments, the mesh mapping system 102 processes a three-dimensional mesh S including a 2-manifold triangular mesh embedded in a three-dimensional space $\mathbb{R}^3$, with vertices V and triangles T. In one or more embodiments, the mesh mapping system 102 utilizes a multilayer perceptron neural network f, which receives as input a single point $p \in \mathbb{R}^3$ concatenated to a global code z, and generates a 3×3 matrix. Accordingly, the mesh mapping system 102 utilizes the multilayer perceptron neural network induces a field of matrices over ambient space and not tied to a specific mesh. Given the mesh S to deform, the mesh mapping system 102 determines, for each triangle $t_i$, a centroid $c_i$ along with the global code z to the multilayer perceptron neural network. Accordingly, the mesh mapping system 102 assigns a matrix $P_i \in \mathbb{R}^{3 \times 3}$ to the triangle $t_i$ via $P_i = f(z, c_i) \in \mathbb{R}^{3 \times 3}$.

According to one or more embodiments, each centroid is represented as a fixed, precomputed vector that includes a concatenation of attributes of the centroid. For example, the centroid can include a concatenation of a three-dimensional position of the centroid, the normal of the centroid, and a Wave-Kernel signature associated with the centroid. As mentioned, the mesh mapping system 102 can also apply the multilayer perceptron in parallel on a large batch of centroids over a GPU for performance gain.

In one or more embodiments, the mesh mapping system 102 defines an intrinsic Jacobian matrix for each triangle in the mesh. The mesh mapping system 102 restricts the extrinsic matrix to the tangent space of its corresponding triangle. For example, the mesh mapping system 102 determines a tangent space at a triangle $t_i \in T$ as a linear space orthogonal to its normal, denoted $T_i$. The mesh mapping system 102 selects two column vectors that form an oriented orthonormal basis to the tangent space to determine a frame as $\mathcal{B}_i \in \mathbb{R}^{3 \times 2}$. The mesh mapping system 102 projects the extrinsic matrix $P_i$ of triangle $t_i$ to an intrinsic linear map by considering its restriction to the subspace of $T_i$, expressed in the frame $\mathcal{B}_i$ as $\pi_i(P_i) \triangleq P_i \mathcal{B}_i$. The mesh mapping system 102 determines the 3×2 restriction of $P_i$ as $R_i \in \mathbb{R}^{3 \times 2}$.

In one or more embodiments, the mesh mapping system 102 generates a piecewise-linear mapping of a given mesh, such that restriction of the mapping to any triangle $t_i$, denoted as $\Phi|_{t_i}$, is affine—i.e., the sum of a linear map and a constant translation. A piecewise linear mapping $\Phi$ of a mesh is uniquely defined by assigning a new position to each one of the vertices, $V_i \rightarrow \Phi_i$. Additionally, the mesh mapping system 102 generates a well-defined mapping for any point inside a triangle by linearly interpolating the mapping from the vertices. In the below description, $\Phi_i$ denotes the ith vertex's new position, and $\Phi$ represents a matrix of the same dimensions as V.

Furthermore, a Jacobian matrix at triangle $t_i$ of the mapping $\Phi$ is a linear transformation of dimensions 3×2 from the triangle's tangent space to $\mathbb{R}^3$, denoted $J_i(x): T_i \rightarrow \mathbb{R}^3$, defined as the linear part of the mapping restricted to the triangle, $\Phi|_{t_i}$. Additionally, the mesh mapping system 102 explicitly computes the Jacobian matrix as a 3×2 matrix in the coordinates of frame $\mathcal{B}_i$ by solving $J_i \mathcal{B}_i^T [v_k - v_j, v_l - v_j] = [\phi_k - \phi_j, \phi_l - \phi_j]$, where $v_j, v_k, v_l$ are the vertices of the triangle, and $\phi_j, \phi_k, \phi_l$ are the vertex images under $\Phi$. By solving the above system, the mesh mapping system 102 obtains a linear system that maps $\Phi$ to the Jacobian $J_i$ in the basis $\mathcal{B}_i$ as $J_i=\Phi \nabla_i^T$. Furthermore, $\nabla_i$ represents the gradient operator of triangle $t_i$, expressed in the basis $\mathcal{B}_i$.

In one or more embodiments, given an arbitrary assignment of a matrix $M_i \in \mathbb{R}^{3\times 2}$ to each triangle, the mesh mapping system 102 retrieves the mapping $\Phi^*$, whose Jacobians $J_i$, expressed in the frames $\mathcal{B}i$, are closest to $M_i$ in terms of least-squares by solving a Poisson problem $$\Phi^* \min_{\Phi} \sum |t_i| \|J_i - M_i\|^2,$$

where $|t_i|$ represents the area of the triangle $t_i$ on the source mesh S. The mesh mapping system 102 determines the Poisson problem using the linear system $\Phi^*=L^{-1}\mathcal{A}\nabla^T M$, where $L=\nabla^T \mathcal{A} \nabla$ represents the cotangent Laplacian of the mesh and $\mathcal{A}$ represents the mass matrix. The solution to the linear system is well-defined up to a global translation that can be resolved by setting, e.g., $P_0^*=\vec{0}$.

In one or more embodiments, the mesh mapping system 102 implements the Poisson model 312 as a custom differentiable layer, given the Poisson model 312 includes a linear function. In some instances, the mesh mapping system 102 utilizes back-propagation to process a gradient input (e.g., the gradient field based on the restricted matrices 310) via the Poisson model 312 to generate the mapping 316. Given that the Poisson model 312 includes a linear function in some embodiments, when backpropagating the incoming gradient, the backpropagation from the linear layer results in solving for the right hand side input again, defined by the gradient.

In some embodiments, the mesh mapping system 102 solves the Poisson problem rapidly during consecutive evaluations by computing a lower-upper decomposition of L into two tridiagonal systems in advance during preprocessing of data (e.g., before training or inference). During training or evaluation, the mesh mapping system 102 more quickly solves the Poisson problem by loading the lower-upper decomposition into GPU memory. The mesh mapping system 102 can further perform backsubstitution on two tridiagonal systems on the GPU.

More specifically, the mesh mapping system 102 performs preprocessing operations via the following algorithm:

Algorithm 1 - Mesh Preprocessing
- Input: Mesh S to preprocess.
- Compute and store the centroid features $C_S = \{c_i\}$
- Compute and store the frames $\mathcal{F}_S = \{\mathcal{B}_i\}$ Compute and store the gradient operator $\nabla_S=\{\nabla_i\}$ in the local frames Compute and store the Laplacian $L_S$ and its lower-upper decomposition The mesh mapping system 102 also performs operations for generating a mapping via the following algorithm:

Algorithm 2 - Mesh Preprocessing
- Input: codeword z, source mesh S, $\nabla_s$, lower-upper decomposition of $L_s$.

- for each centroid $c_i \in C$ in parallel on the GPU, do
  - Apply f to concatenation of $c_i$, z to get $P_i$.
  - Restrict $P_i$ to the tangent space $R_i$.
- end for Compute the mapping $\Phi$ by solving the linear system of the Poisson problem using $\nabla_S$ and the lower-upper decomposition of $L_S$.

Output: the mapping $\Phi$ assigning a new position to each vertex of S.

For a collection of meshes, in one or more embodiments, the mesh mapping system 102 runs Algorithm 1 above on each of the meshes in advance and stores all computed data. Additionally, the mesh mapping system 102 loads a mesh's data and runs Algorithm 2 above during training or inference.

Figure 5:
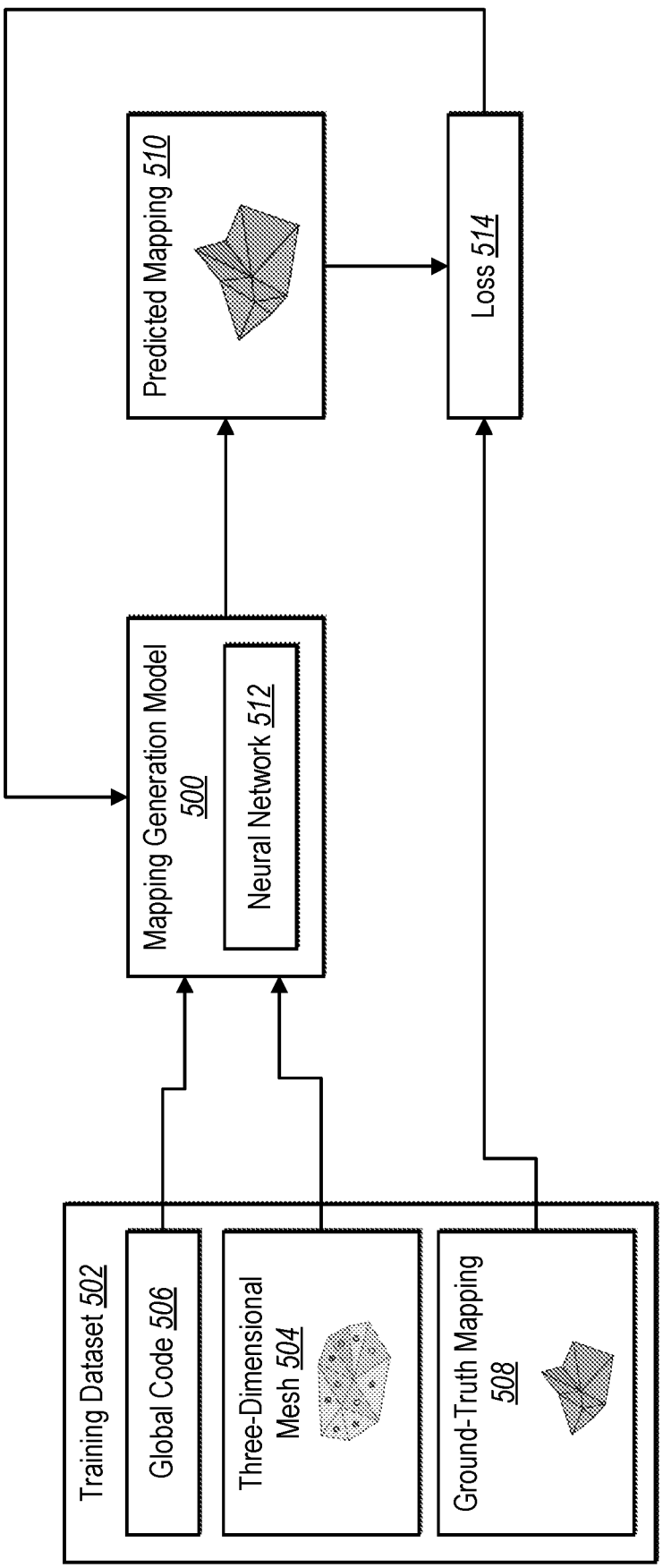
FIG. 5 illustrates a diagram of the mesh mapping system learning parameters of a neural network in connection with generating predicted mappings in accordance with one or more implementations.

FIG. 5 illustrates a diagram in which the mesh mapping system 102 trains a mapping generation model 500 to generate matrices representing polygons of three-dimensional meshes. Specifically, the mesh mapping system 102 utilizes a training dataset 502 including triplets, each including a three-dimensional mesh 504, a global code 506, and a ground-truth mapping 508. For example, the three-dimensional mesh 504 includes a plurality of triangles connected via a plurality of edges. Additionally, the global code 506 includes an encoding of the three-dimensional mesh 504. Furthermore, the ground-truth mapping 508 includes a previously determined mapping between the three-dimensional mesh 504 and a target pose or shape of the three-dimensional mesh 504.

In one or more embodiments, the mesh mapping system 102 utilizes the mapping generation model 500 to generate a predicted mapping 510 from the three-dimensional mesh 504 and the global code 506 of the training dataset 502. In particular, the mapping generation model 500 includes a neural network 512 (e.g., a multilayer perceptron conditioned on the global code 506) to generate a set of matrices in ambient space for the three-dimensional mesh 504. The mapping generation model 500 utilizes a restriction operator (e.g., a set of mesh-specific linear algebra operations) on the set of matrices in ambient space to generate a set of restricted matrices in tangent spaces of the polygons of the three-dimensional mesh 504. Furthermore, the mapping generation model 500 generates the predicted mapping 510 based on the restricted matrices.

According to one or more embodiments, the mesh mapping system 102 utilizes the predicted mapping 510 to determine a loss 514 for training the mapping generation model 500. Specifically, the mesh mapping system 102 determines the loss 514 based on a difference between the predicted mapping 510 and the ground-truth mapping 508. For example, the mesh mapping system 102 determines the loss via a distance between respective vertices and Jacobian matrices in the predicted mapping 510 and the ground-truth mapping 508. To illustrate, the mesh mapping system 102 utilizes the loss 514 to learn parameters of the neural network 512. Additionally, the mesh mapping system 102 can utilize a plurality of training samples or evaluation samples on a plurality of different meshes with different triangulations without affecting the predicted mapping 510.

In one or more embodiments, as mentioned the mesh mapping system 102 performs training operations over a dataset of triplets that include a mesh, its corresponding mapping, and a global code for conditioning the prediction of the neural network, $\{(S^i, \Psi^i, z^i)\}_{i=1}^n$. During training, the mesh mapping system 102 iterates over the pairs, and for each pair, the mesh mapping system 102 trains the neural network to predict a mapping $\hat{\Phi}^i$ of the mesh $S^i$, conditioned on the global code $z^i$. The mesh mapping system 102 further utilizes a loss defined with respect to the ground-truth mapping $\Psi^i$.

For example, the mesh mapping system 102 determines two losses: a vertex-vertex loss between the predicted mapping $\Phi$ and the ground-truth mapping $\Psi$ as $L_v = \Sigma |V_i| \|\Phi_i - \Psi_i\|^2$, where $|V_i|$ represents the lumped mass around the ith vertex in S; and a difference between the restricted predictions $\{R_i\}$ and the ground-truth Jacobian matrices $J_i = \{\nabla_i \Psi\}$ as $L_J = \Sigma |t_i| \|R_i - J_i\|^2$. The total loss thus is represented as $L_{total} = 10 L_v + L_J$. The mesh mapping system 102 determines both losses through the use of the differential operators after inference. The algorithm below summarizes the training process:

---

Algorithm 3 - Training epoch
for each source and target pair S, $\Psi$ in the dataset do
- Load the lower-upper decomposition and V of S to processor memory
- Encode S, $\Psi$ into a codeword z. (This is specific to an experiment implementation).
- Feed S and z to Algorithm 2 above to compute the mapping $\Phi$.
- Compute the loss $L_{total}$.
- Optimize parameters of f using backpropagated gradients.
end for

---

As previously mentioned, the mesh mapping system 102 generates mappings for generating modified three-dimensional meshes according to one or more target poses and/or shapes. For example, FIG. 6 illustrates an embodiment in which the mesh mapping system 102 generates mappings for a variety of different three-dimensional meshes. More specifically, the mesh mapping system 102 trains a neural network on a set of meshes for use with a variety of different mesh types due to the triangulation-agnostic process of generating the mappings. FIG. 6 illustrates that the mesh mapping system 102 utilizes a single neural network trained on a set of meshes to generate mappings for a first three-dimensional mesh 600 corresponding to a first shape and a second three-dimensional mesh 602 corresponding to a second shape. The mesh mapping system 102 utilizes the neural network to generate mappings conditioned on similar poses for the meshes of different triangulations, resulting in similar target poses in the modified three-dimensional meshes.

FIG. 7 illustrates that the mesh mapping system 102 utilizes a mapping generation model (including a trained neural network) to generate mappings for a plurality of different poses. In particular, as mentioned, the mesh mapping system 102 provides a global code representing a target pose to the mapping generation model to create a mapping based on the target pose. Thus, for different target poses, the mesh mapping system 102 generates or otherwise obtains different global codes from which to generate a mapping. FIG. 7 illustrates that the mesh mapping system 102 generates, for an initial three-dimensional mesh 700, a plurality of modified three-dimensional meshes 702a-702c via a plurality of different mappings. Additionally, FIG. 7 illustrates a plurality of ground-truth meshes 704a-704c corresponding to the target poses.

In additional embodiments, the mesh mapping system 102 generates mappings for partial models. Specifically, FIG. 8 illustrates that the mesh mapping system 102 utilizes a neural network to generate mappings for deforming decimated/partial three-dimensional meshes. For example, by generating triangulation-agnostic mappings, the mesh mapping system 102 generates sets of modified three-dimensional meshes 800a-800d with different poses according to neural network-based mappings. FIG. 8 also illustrates a set of corresponding ground-truth three-dimensional meshes 802 for the different poses.

Figure 9:
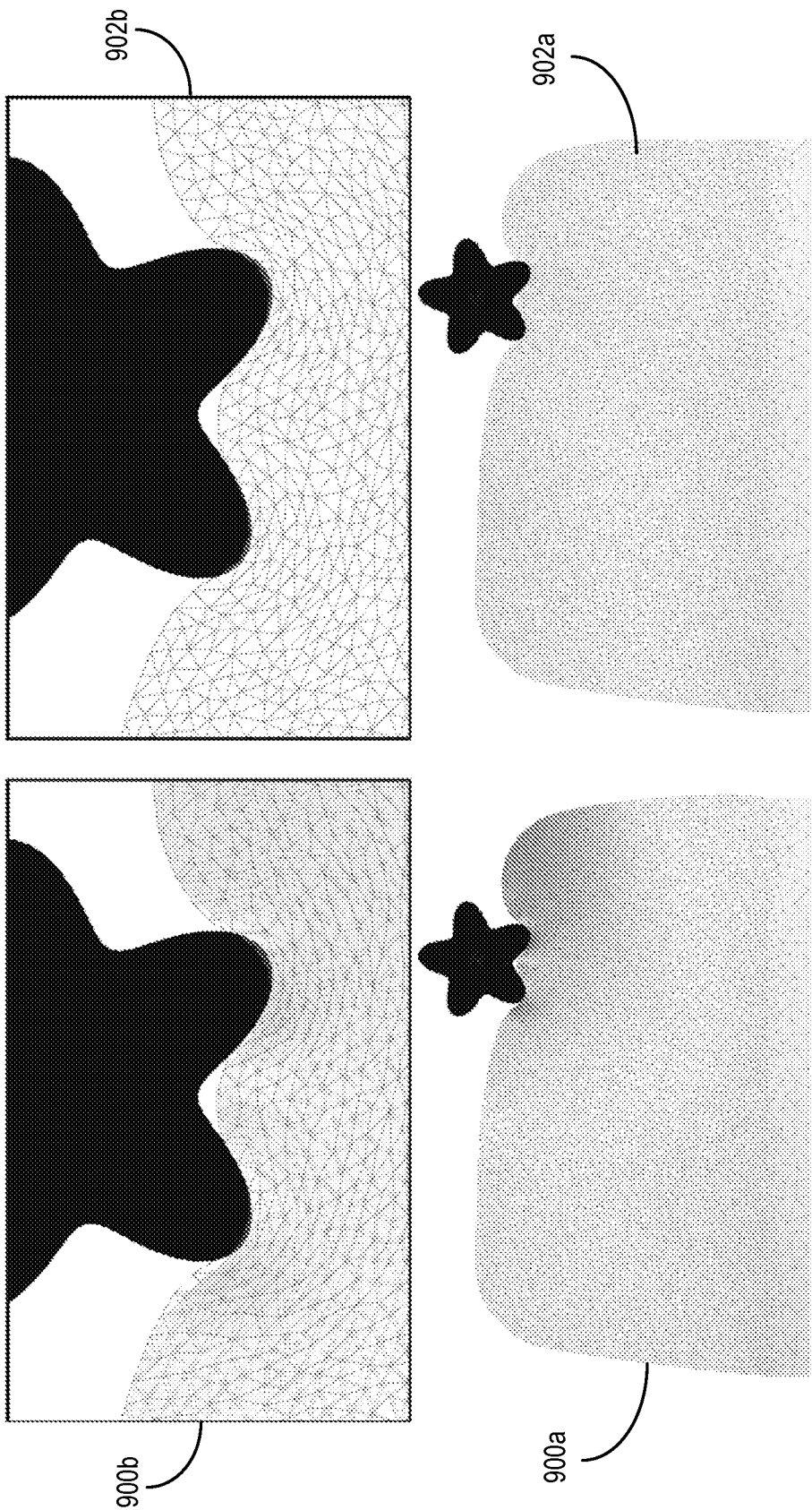
FIG. 9 illustrates a diagram of a comparison of mesh collision of generated three-dimensional meshes by the mesh mapping system and a conventional system in accordance with one or more implementations.

The mesh mapping system 102 also provides improved collision handling over conventional systems. FIG. 9 illustrates a three-dimensional mesh 900a generated by a conventional system colliding with an object and deforming in response to the collision. Specifically, the conventional system is described by Christian Romero, Dan Casas, Jesus Perez, and Miguel A. Otaduy in "Learning contact corrections for handle-based subspace dynamics" in ACM SIGGRAPH (2021) (hereinafter "Romero"). FIG. 9 further illustrates a closeup FIG. 900b of the deformation of the three-dimensional mesh caused by the collision relative to a ground-truth deformation from the collision. FIG. 9 illustrates a three-dimensional mesh 902a generated by the mesh mapping system 102 colliding with the object and deforming in response to the collision. Additionally, FIG. 9 illustrates a closeup FIG. 902b of the deformation of the three-dimensional mesh caused by the collision relative to the ground-truth deformation from the collision. As shown, the mesh mapping system 102 provides more accurate collision than the conventional system.

Figure 10:
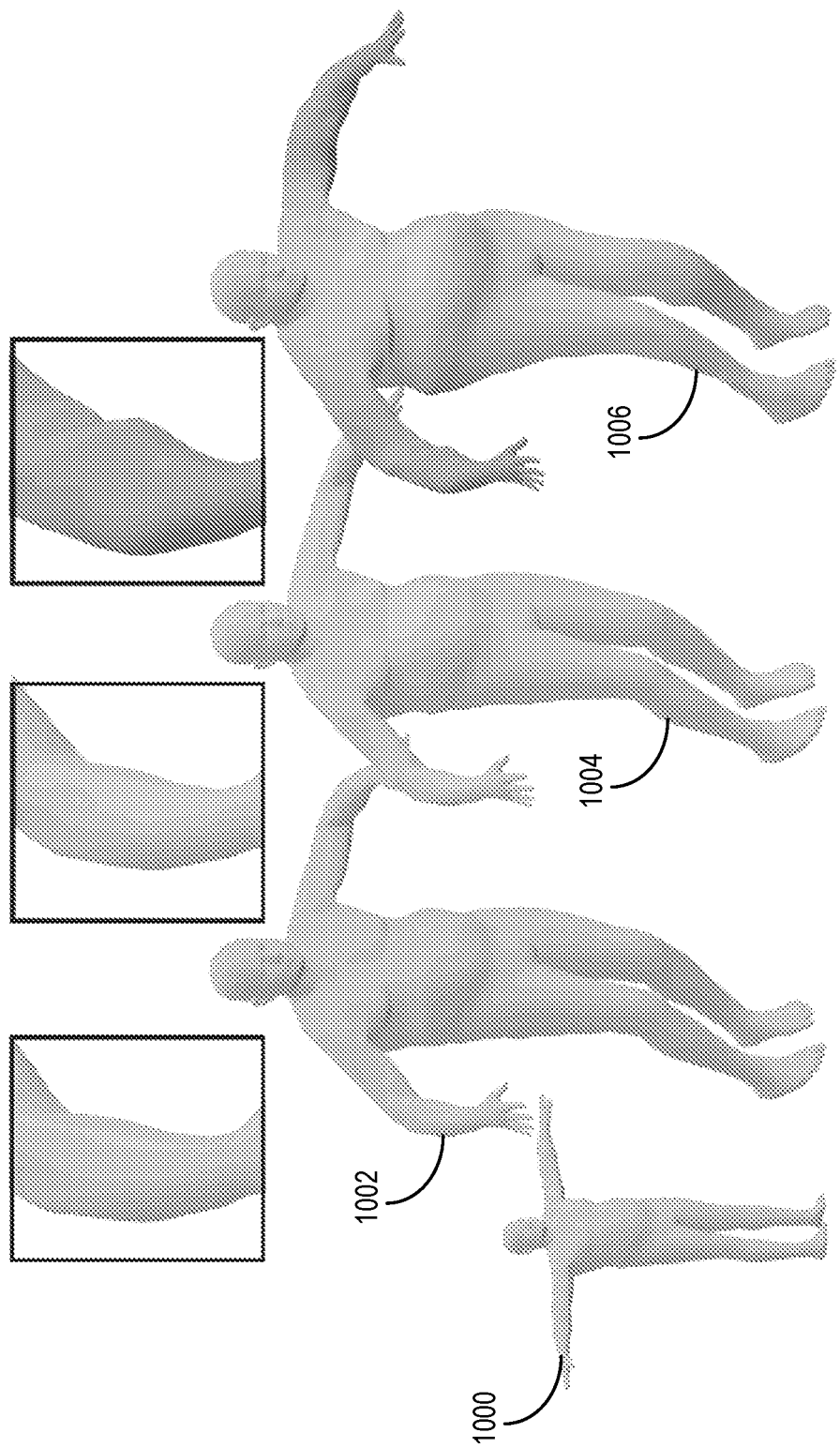
FIG. 10 illustrates a diagram of comparisons of a ground-truth three-dimensional mesh and generated three-dimensional meshes by the mesh mapping system and a conventional system in accordance with one or more implementations.

FIG. 10 also illustrates comparisons of a performance of the mesh mapping system 102 relative to ground-truth and a conventional system that uses cages for generating mesh mappings. In particular, FIG. 10 illustrates a source three-dimensional mesh 1000 for deforming to a target pose. For example, FIG. 10 illustrates a ground-truth deformed model 1002, a deformed three-dimensional mesh 1004 generated by the mesh mapping system 102, and a deformed three-dimensional mesh 1006 generated by the conventional system (along with corresponding close-up views). The conventional system is described by Yifan Wang, Noam Aigerman, Vladimir Kim, Siddartha Chaudhuri, and Olga Sorkine-Hornung in "Neural cages for detail-preserving 3D deformations" in CVPR (2020) (hereinafter "Wang"). As shown, the deformed three-dimensional mesh 1004 generated by the mesh mapping system 102 based on a generated mapping is more accurate than the deformed three-dimensional mesh 1006 generated by the conventional system.

The table below provides comparisons of the performance of the mesh mapping system 102 ("System 102") in a plurality of tests ("as-rigid-as-possible" ("ARAP") deformation, collision handling ("CH"), and re-posing ("RP")) relative to a plurality of conventional systems, which include Romero and Wang, as previously described. Additionally, the table includes results related to a baseline model ("Baseline") as described by Qingyang Tan, Zherong Pan, Lin Gao, and Dinesh Manocha in "Realtime simulation of thin-shell deformable materials using CNN-based mesh embedding," in IEEE Robotics and Automation Letters 5 (2020). Specifically, the comparisons include the L2 distance over mesh vertices after normalizing to a unit sphere and scaling by 102 ("L2-V"), the L2 distance over the Jacobian matrices scaled by 10 ("L2-J"), the average angular error on the face normal in degrees ("L2-N"), and the number of feed-forward inferences ("Hz") per second using a single GPU and a batch size of one. As shown below, the mesh mapping system 102 provides improved performance over the baseline model and conventional systems.

|  | L2-V ↓ | L2-V ↓ | L2-V ↓ | L2-V ↓ |
| --- | --- | --- | --- | --- |
| ARAP: Baseline | 3.66 | 1.82 | 13.6 | — |
| ARAP: System 102 | 0.64 | 0.43 | 2.7 | — |
| CH: Romero | 0.424 | — | — | 980 |
| CH: System 102 | 0.398 | 0.17 | — | 109 |
| RP: Wang | 3.87 | 1.56 | 9.6 | — |
| RP: System 102 | 0.84 | 0.83 | 2.4 | 87 |

In additional embodiments, the mesh mapping system 102 provides mapping of three-dimensional meshes in a plurality of different scenarios. For example, the mesh mapping system 102 provides mesh mapping in connection with visual loss processes that utilize a neural renderer for mapping a shape to match target poses or styles. In additional examples, the mesh mapping system 102 generates mappings for smoothed shapes onto an original geometry for learning a latent space of details, which the mesh mapping system 102 or another system can apply to other meshes. The mesh mapping system 102 can also provide mesh mapping in unsupervised learning scenarios, including optimizing distortion and quality measures.

Furthermore, the mesh mapping system 102 provides the mesh mapping process as a differentiable layer, which enables the use of various losses in terms of map predictions. For instance, the mesh mapping system 102 utilizes a neural network-based mapping to define a differentiable loss for a source mesh that measures the performance of the network relative to a given target. The mesh mapping system 102 further optimizes the source mesh to reduce the loss and better fit the target, which is useful for optimizing a mesh to accommodate a desired transformation space. In some embodiments, the mesh mapping system 102 provides mesh mapping for tetrahedral meshes and two-dimensional meshes, in which case the mesh mapping system 102 can skip utilizing the restriction operator for restricting matrices.

Figure 11:
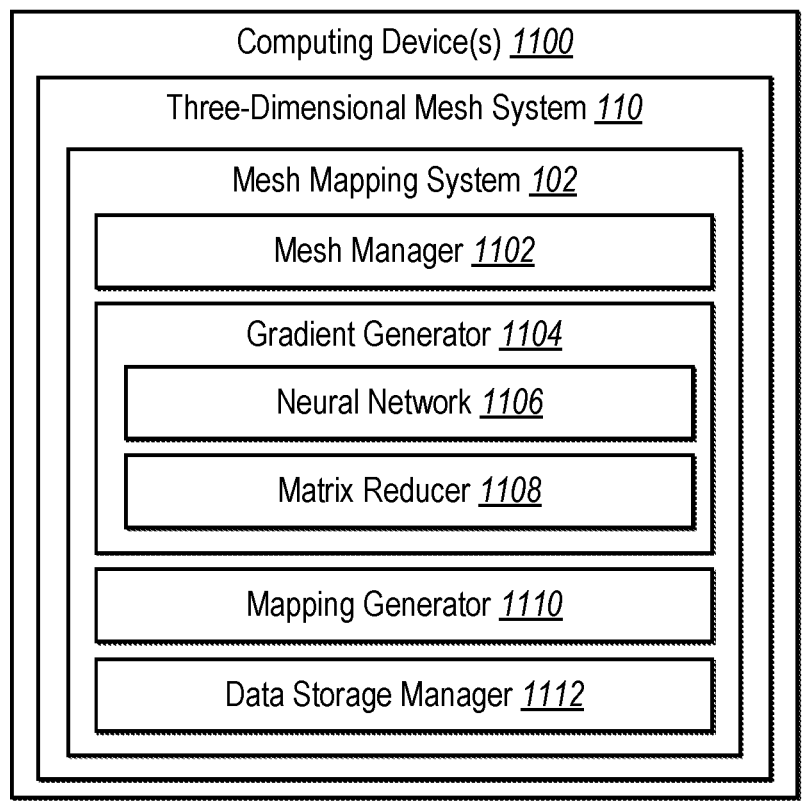
FIG. 11 illustrates a diagram of the mesh mapping system of FIG. 1 in accordance with one or more implementations.

FIG. 11 illustrates a detailed schematic diagram of an embodiment of the mesh mapping system 102 described above. As shown, the mesh mapping system 102 is implemented in a three-dimensional mesh system 110 on computing device(s) 1100 (e.g., a client device and/or server device as described in FIG. 1, and as further described below in relation to FIG. 11). Additionally, the mesh mapping system 102 includes, but is not limited to, a mesh manager 1102, a gradient generator 1104 including a neural network 1106 and a matrix restricter 1108, a mapping generator 1110, and a data storage manager 1112. The mesh mapping system 102 can be implemented on any number of computing devices. For example, the mesh mapping system 102 can be implemented in a distributed system of server devices for generating mappings of three-dimensional meshes. The mesh mapping system 102 can also be implemented within one or more additional systems. Alternatively, the mesh mapping system 102 can be implemented on a single computing device such as a single client device.

In one or more embodiments, each of the components of the mesh mapping system 102 is in communication with other components using any suitable communication technologies. Additionally, the components of the mesh mapping system 102 are capable of being in communication with one or more other devices including other computing devices of a user, server devices (e.g., cloud storage devices), licensing servers, or other devices/systems. It will be recognized that although the components of the mesh mapping system 102 are shown to be separate in FIG. 11, any of the subcomponents may be combined into fewer components, such as into a single component, or divided into more components as may serve a particular implementation. Furthermore, although the components of FIG. 11 are described in connection with the mesh mapping system 102, at least some of the components for performing operations in conjunction with the mesh mapping system 102 described herein may be implemented on other devices within the environment.

In some embodiments, the components of the mesh mapping system 102 include software, hardware, or both. For example, the components of the mesh mapping system 102 include one or more instructions stored on a computer-readable storage medium and executable by processors of one or more computing devices (e.g., the computing device(s) 1100). When executed by the one or more processors, the computer-executable instructions of the mesh mapping system 102 cause the computing device(s) 1100 to perform the operations described herein. Alternatively, the components of the mesh mapping system 102 can include hardware, such as a special purpose processing device to perform a certain function or group of functions. Additionally, or alternatively, the components of the mesh mapping system 102 can include a combination of computer-executable instructions and hardware.

Furthermore, the components of the mesh mapping system 102 performing the functions described herein with respect to the mesh mapping system 102 may, for example, be implemented as part of a stand-alone application, as a module of an application, as a plug-in for applications, as a library function or functions that may be called by other applications, and/or as a cloud-computing model. Thus, the components of the mesh mapping system 102 may be implemented as part of a stand-alone application on a personal computing device or a mobile device. Alternatively, or additionally, the components of the mesh mapping system 102 may be implemented in any application that provides digital image modification, including, but not limited to ADOBE® AFTER EFFECTS®, ADOBE® ILLUSTRATOR®, and ADOBE® CREATIVE CLOUD®.

The mesh mapping system 102 includes a mesh manager 1102 to manage three-dimensional meshes. For example, the mesh manager 1102 identifies source three-dimensional meshes for training and utilizing a neural network that generates mappings. Additionally, in some embodiment, the mesh manager 1102 generates or otherwise obtains preprocessing data associated with generating a mapping of a three-dimensional mesh relative to a target pose. To illustrate, the mesh manager 1102 generates or obtains global codes, centroid features, and differential operators.

The mesh mapping system 102 also includes a gradient generator 1104 to generate gradient fields of three-dimensional meshes in connection with generating mappings. Specifically, the gradient generator 1104 includes a neural network 1106 to generate matrices including linear transformations of vertices of a three-dimensional mesh relative to a target pose. Additionally, the gradient generator 1104 includes a matrix restricter 1108 to generate restricted matrices based on the matrices generated by the neural network 1106. The gradient generator 1104 generates a gradient field in tangent spaces of polygons of a mesh based on the restricted matrices.

The mesh mapping system 102 includes a mapping generator 1110 to generate mappings for three-dimensional meshes. In particular, the mapping generator 1110 utilizes restricted matrices in tangent spaces of polygons of a three-dimensional mesh to generate a mapping of linear transformations of points for a target pose. For example, the mapping generator 1110 utilizes a Poisson model to generate mappings according to differential operators associated with three-dimensional meshes.

The mesh mapping system 102 also includes a data storage manager 1112 (that comprises a non-transitory computer memory/one or more memory devices) that stores and maintains data associated with generating mappings of three-dimensional meshes. For example, the data storage manager 1112 stores data associated with three-dimensional matrices including vertex data, target pose data, matrices, restricted matrices, gradient fields, and modified three-dimensional meshes. The data storage manager 1112 also stores data associated with training neural networks in connection with generating mappings of three-dimensional meshes.

Figure 12:
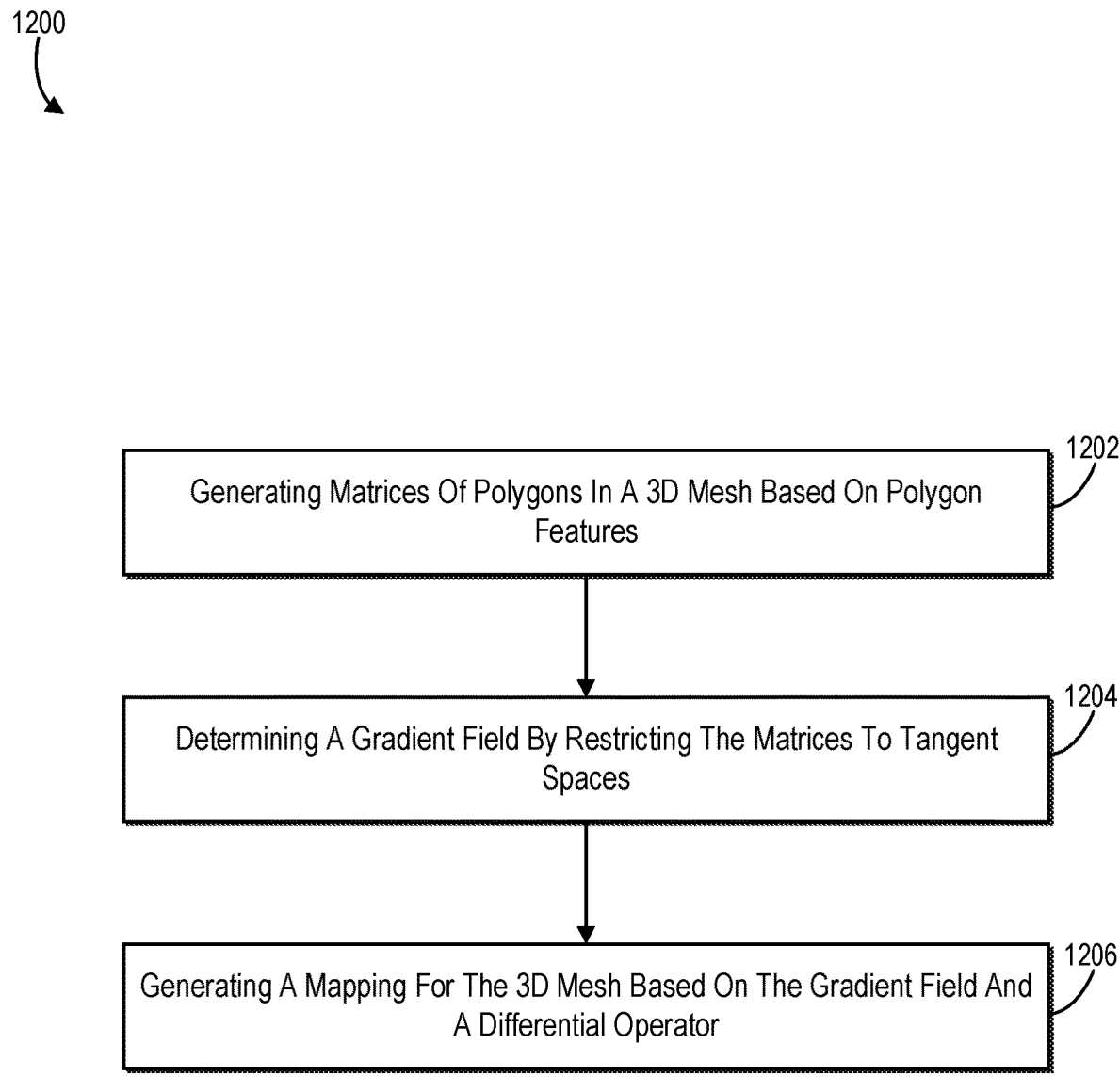
FIG. 12 illustrates a flowchart of a series of acts for generating a mapping of a three-dimensional mesh based on a neural network-generated gradient field in accordance with one or more implementations.

Turning now to FIG. 12, this figure shows a flowchart of a series of acts 1200 of generating a mapping of a three-dimensional mesh based on a neural network-generated gradient field. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As shown, the series of acts 1200 includes an act 1202 of generating matrices of polygons in a three-dimensional ("3D") mesh based on polygon features. For example, act 1202 involves generating, utilizing a neural network, a plurality of matrices over an ambient space for a plurality of polygons of a three-dimensional mesh based on a plurality of features of the plurality of polygons associated with the three-dimensional mesh. Act 1202 can involve generating the plurality of matrices over an ambient space for a plurality of triangles of the three-dimensional mesh.

Act 1202 can involve determining a global code comprising an encoding based on a shape of the three-dimensional mesh. For instance, act 1202 can involve determining the global code corresponding to a target pose or a target shape of the three-dimensional mesh. Act 1202 can also involve combining the plurality of features of the plurality of polygons and the global code. Act 1202 can involve generating a concatenated value comprising a centroid feature of a polygon of the three-dimensional mesh and the global code. For example, act 1202 can involve determining the centroid feature of the polygon by generating a feature vector based on a three-dimensional position of a centroid of the polygon, a normal of the centroid, and a shape encoding of the centroid. In additional embodiments, act 1202 involves determining three-dimensional positions, normals, and shape encodings of the plurality of polygons. Act 1202 can involve generating, utilizing the neural network comprising a multilayer perceptron neural network, a matrix for the polygon based on the concatenated value.

The series of acts 1200 also includes an act 1204 of determining a gradient field by restricting the matrices to tangent spaces. For example, act 1204 involves determining a gradient field based on the plurality of matrices of the plurality of polygons. Act 1204 can involve restricting the plurality of matrices from the ambient space to a plurality of restricted matrices in tangent spaces of the plurality of polygons of the three-dimensional mesh. Act 1204 can also involve reducing a dimensionality of a matrix of the plurality of matrices from the ambient space to a tangent space of a corresponding polygon of the plurality of polygons. Act 1204 can further involve restricting, in parallel, the plurality of matrices from the ambient space to a plurality of restricted matrices with reduced dimensionality in corresponding tangent spaces of the plurality of polygons of the three-dimensional mesh.

For example, act 1204 can involve restricting a first matrix of the plurality of matrices from the ambient space to a first restricted matrix in a first tangent space of a first triangle of the plurality of triangles. Act 1204 can also involve restricting, in parallel with the first matrix, a second matrix of the plurality of matrices from the ambient space to a second restricted matrix in a second tangent space of a second triangle of the plurality of triangles.

Additionally, the series of acts 1200 includes an act 1206 of generating a mapping for the three-dimensional mesh based on the gradient field and a differential operator. For example, act 1206 involves generating a mapping for the three-dimensional mesh based on the gradient field and a differential operator corresponding to the three-dimensional mesh. Act 1206 can involve generating, utilizing the differential operator corresponding to the three-dimensional mesh, the mapping based on the plurality of restricted matrices of the plurality of polygons.

Act 1206 can involve determining a Laplacian operator corresponding to the three-dimensional mesh. Act 1206 can also involve generating the mapping by utilizing the Laplacian operator to process the plurality of restricted matrices of the plurality of polygons. Act 1206 can involve determining a gradient operator corresponding to the three-dimensional mesh.

Act 1206 can involve determining a target pose for the three-dimensional mesh. For example, act 1206, or another act, can involve determining a global code based on the target pose. Act 1206 can also involve determining, according to the gradient field and the differential operator, a plurality of updated positions of vertices of the three-dimensional mesh based on a target pose of the three-dimensional mesh.

Act 1206 can involve utilizing a Poisson model to process the gradient field according to a Laplacian operator corresponding to the three-dimensional mesh. Act 1206 can further involve utilizing the Poisson model to process the gradient field according to a gradient operator corresponding to the three-dimensional mesh.

In one or more embodiments, the series of acts 1200 includes generating, according to the mapping, a modified three-dimensional mesh comprising updated positions of a plurality of vertices of the three-dimensional mesh. For example, the series of acts 1200 includes generating the modified three-dimensional mesh comprising the updated positions of the plurality of vertices according to a plurality of linear transformations from the mapping.

In one or more embodiments, the series of acts 1200 includes determining a loss by determining vertex-vertex distances and gradient distances between the mapping of the three-dimensional mesh and a ground-truth mapping of the three-dimensional mesh. The series of acts 1200 also includes modifying one or more parameters of the neural network based on the loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
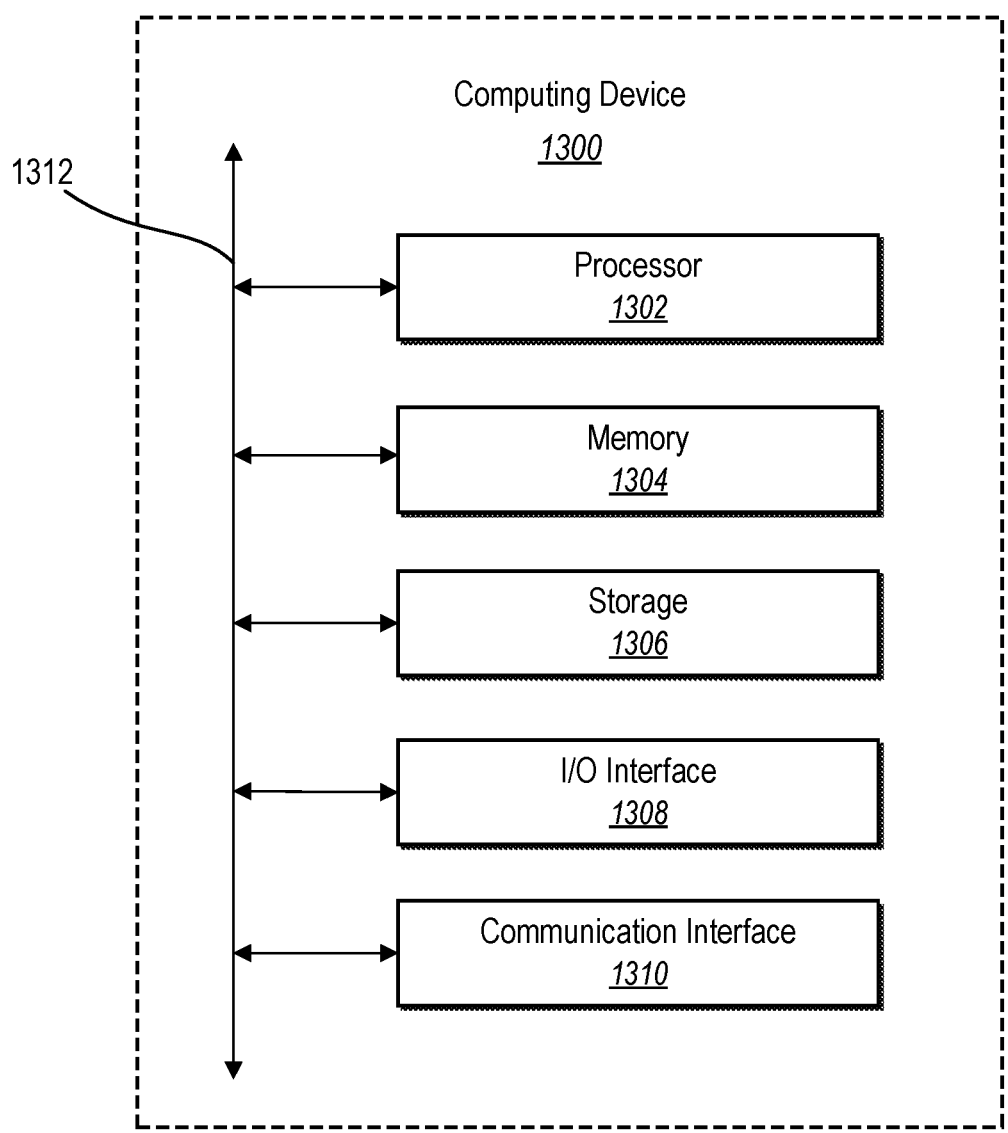
FIG. 13 illustrates a block diagram of an exemplary computing device in accordance with one or more embodiments.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining, by at least one processor in response to an operation to re-pose a three-dimensional mesh from an initial pose to a target pose, a global code comprising an encoding vector representing a plurality of joint angles of the target pose;
   generating, by the at least one processor utilizing a neural network conditioned on the global code, a plurality of matrices over an ambient space for a plurality of polygons of the three-dimensional mesh based on a plurality of features representing the plurality of polygons of the three-dimensional mesh in the initial pose and the encoding vector of the global code of the target pose;
   determining, by the at least one processor, a gradient field by restricting the plurality of matrices of the plurality of polygons to tangent spaces of the plurality of polygons; and
   generating, by the at least one processor, a mapping for re-posing the three-dimensional mesh from the initial pose to the target pose based on the gradient field and a differential operator corresponding to the three-dimensional mesh.

2. The computer-implemented method of claim 1, wherein generating the plurality of matrices comprises:
   determining the global code by obtaining, based on the target pose for the three-dimensional mesh, the global code from a database of previously generated encodings corresponding to a plurality of target poses; and
   combining the plurality of features representing the plurality of polygons with the global code.

3. The computer-implemented method of claim 2, wherein generating the plurality of matrices comprises:
   generating a concatenated value comprising a centroid feature of a polygon of the three-dimensional mesh and the global code; and
   generating, utilizing the neural network comprising a multilayer perceptron neural network, a matrix for the polygon based on the concatenated value.

4. The computer-implemented method of claim 3, further comprising determining the centroid feature of the polygon by generating a feature vector based on a three-dimensional position of a centroid of the polygon, a normal of the centroid, and a shape encoding of the centroid.

5. The computer-implemented method of claim 1, wherein determining the gradient field comprises restricting the plurality of matrices from the ambient space to a plurality of restricted matrices in the tangent spaces of the plurality of polygons of the three-dimensional mesh.

6. The computer-implemented method of claim 5, wherein restricting the plurality of matrices comprises reducing a dimensionality of a matrix of the plurality of matrices from the ambient space to a tangent space of a corresponding polygon of the plurality of polygons.

7. The computer-implemented method of claim 5, wherein generating the mapping comprises generating, utilizing the differential operator corresponding to the three-dimensional mesh, the mapping based on the plurality of restricted matrices of the plurality of polygons.

8. The computer-implemented method of claim 7, wherein generating the mapping comprises:
   determining a Laplacian operator corresponding to the three-dimensional mesh; and
   generating the mapping by utilizing the Laplacian operator to process the plurality of restricted matrices of the plurality of polygons.

9. The computer-implemented method of claim 1, further comprising:
   determining the global code comprising the encoding vector by encoding the target pose from a sampled point cloud corresponding to the target pose.

10. A system comprising:
    one or more computer memory devices; and
    one or more processing devices configured to cause the system to:
       determine, in response to an operation to modify a three-dimensional mesh from an initial shape to a target shape, a global code comprising an encoding vector representing a plurality of joint angles of the target shape;
       generate, utilizing a neural network conditioned on the encoding vector of the global code, a plurality of matrices over an ambient space for a plurality of polygons of a three-dimensional mesh by combining a plurality of features representing the plurality of polygons of the three-dimensional mesh in the initial shape with the global code of the target shape;
       determine a gradient field by restricting the plurality of matrices of the plurality of polygons to tangent spaces of the plurality of polygons;
       generate a mapping for modifying the three-dimensional mesh from the initial shape to the target shape based on the gradient field and a differential operator corresponding to the three-dimensional mesh; and
       generate, according to the mapping, a modified three-dimensional mesh comprising updated positions of a plurality of vertices of the three-dimensional mesh in the target shape according to the plurality of joint angles of the target shape.

11. The system of claim 10, wherein the one or more processing devices are further configured to cause the system to generate the plurality of matrices by:
    determining the global code comprising the encoding vector from a database of previously generated global codes for a plurality of target shapes or by encoding a sampled point cloud corresponding to the target shape;
    generating concatenated values by concatenating the plurality of features of the plurality of polygons and the global code; and
    generating, utilizing the neural network, the plurality of matrices for the plurality of polygons based on the concatenated values.

12. The system of claim 11, wherein the one or more processing devices are further configured to cause the system to determine the plurality of features representing the plurality of polygons based on three-dimensional positions, normals, and shape encodings of the plurality of polygons.

13. The system of claim 10, wherein the one or more processing devices are further configured to cause the system to determine the gradient field by restricting, in parallel, the plurality of matrices from the ambient space to a plurality of restricted matrices with reduced dimensionality in corresponding tangent spaces of the plurality of polygons of the three-dimensional mesh.

14. The system of claim 13, wherein the one or more processing devices are further configured to cause the system to generate the mapping comprises generating the mapping by utilizing a Laplacian operator corresponding to the three-dimensional mesh to process the plurality of restricted matrices of the plurality of polygons.

15. The system of claim 10, wherein the one or more processing devices are further configured to cause the system to:
    determine a loss by determining vertex-vertex distances and gradient distances between the mapping of the three-dimensional mesh and a ground-truth mapping of the three-dimensional mesh; and
    modify one or more parameters of the neural network based on the loss to reduce the vertex-vertex distances and the gradient distances.

16. A non-transitory computer readable medium comprising instructions that, when executed by at least one processor, cause the at least one processor to perform operations comprising:
    determining, in response to an operation to modify a three-dimensional mesh from an initial shape to a target shape, a global code comprising an encoding vector representing a plurality of joint angles of the target shape;
    generating, utilizing a neural network conditioned on the encoding vector of the global code, a plurality of matrices over an ambient space for a plurality of triangles of the three-dimensional mesh by combining a plurality of features representing the plurality of triangles of the three-dimensional mesh in the initial shape with the global code of the target shape;
    determining a gradient field by restricting the plurality of matrices of the plurality of triangles to corresponding tangent spaces of the plurality of triangles;
    generating a mapping for modifying the three-dimensional mesh from the initial shape to the target shape based on the gradient field and a differential operator determined based on the three-dimensional mesh; and
    generating, according to the mapping, a modified three-dimensional mesh comprising updated positions of a plurality of vertices of the three-dimensional mesh in the target shape according to the plurality of joint angles of the target shape.

17. The non-transitory computer readable medium of claim 16, wherein generating the plurality of matrices by:
    generating a concatenated value for a triangle of the plurality of triangles of the three-dimensional mesh by concatenating a centroid feature of the triangle and the global code; and
    generating, utilizing the neural network, a matrix for the triangle based on the concatenated value.

18. The non-transitory computer readable medium of claim 17, wherein generating the plurality of matrices comprises:
    determining a three-dimensional position, a normal, and a shape encoding of a centroid of the triangle; and
    determine the centroid feature based on the three-dimensional position, the normal, and the shape encoding of a centroid of the triangle.

19. The non-transitory computer readable medium of claim 16, wherein determining the gradient field comprises:

restricting a first matrix of the plurality of matrices from the ambient space to a first restricted matrix in a first tangent space of a first triangle of the plurality of triangles; and restricting, in parallel with the first matrix, a second matrix of the plurality of matrices from the ambient space to a second restricted matrix in a second tangent space of a second triangle of the plurality of triangles.

20. The non-transitory computer readable medium of claim 16, wherein generating the mapping comprises generating the mapping by utilizing a Poisson model to process the gradient field according to a Laplacian operator corresponding to the three-dimensional mesh.

\* \* \* \* \*